United States Patent
Sun et al.

(10) Patent No.: US 12,185,139 B2
(45) Date of Patent: Dec. 31, 2024

(54) METHODS AND APPARATUS FOR CONFIGURING W1, W2, AND WF FOR PORT SELECTION CODEBOOK ENHANCEMENT

(71) Applicant: APPLE INC., Cupertino, CA (US)

(72) Inventors: Haitong Sun, Cupertino, CA (US); Chunhai Yao, Beijing (CN); Dawei Zhang, Beijing (CN); Hong He, Cupertino, CA (US); Seyed Ali Akbar Fakoorian, San Diego, CA (US); Wei Zeng, Cupertino, CA (US); Weidong Yang, San Diego, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 631 days.

(21) Appl. No.: 17/593,721

(22) PCT Filed: May 10, 2021

(86) PCT No.: PCT/CN2021/092790
§ 371 (c)(1),
(2) Date: Sep. 23, 2021

(87) PCT Pub. No.: WO2022/236586
PCT Pub. Date: Nov. 17, 2022

(65) Prior Publication Data
US 2022/0361015 A1 Nov. 10, 2022

(51) Int. Cl.
*H04W 24/08* (2009.01)
*H04L 5/00* (2006.01)
(52) U.S. Cl.
CPC ........... *H04W 24/08* (2013.01); *H04L 5/0048* (2013.01)
(58) Field of Classification Search
CPC ...... H04W 24/08; H04L 5/0048; H04L 5/005; H04L 5/0094; H04L 5/0057;
(Continued)

(56) References Cited

U.S. PATENT DOCUMENTS 11,901,979 B2 * 2/2024 Liu .................. H04B 7/063
11,923,940 B2 * 3/2024 Li ................... H04B 7/0479
(Continued)

FOREIGN PATENT DOCUMENTS

CN      110830092 A    2/2020
CN      110855336 A    2/2020
(Continued)

OTHER PUBLICATIONS

Huawei, HiSilicon, "Summary of CSI enhancements for MTRP and FDD", R1-210xxxx, 3GPP TSG RAN WG1 Meeting #104bis-e, e-Meeting, Agenda Item 8.1.4, Apr. 12-20, 2021, 39 pages.
(Continued)

*Primary Examiner* — Brian T O Connor
(74) *Attorney, Agent, or Firm* — Dorsey & Whitney LLP

(57) ABSTRACT

Apparatus and methods are provided for port selection codebook configuration. A user equipment (UE) may decode a channel state information (CSI) report configuration (CSI-ReportConfig) from a base station. The CSI-ReportConfig configuring a port selection codebook comprising a port selection matrix $W_1$, a combinational coefficient matrix $W_2$, and a frequency basis selection matrix $W_f$. Based on the CSI-ReportConfig, the determines, for the port selection matrix $W_1$, up to L CSI reference signal (CSI-RS) ports out of P CSI-RS ports configured for measuring and reporting CSI. For the frequency basis selection matrix $W_f$, the UE determines up to Mv frequency basis out of N frequency basis. For the combinational coefficient matrix $W_2$, the UE determines up to L*Mv entries per layer. The UE reports one or more of the port selection matrix $W_1$, the combinational coefficient matrix $W_2$, and the frequency basis selection matrix $W_f$ to the base station.

18 Claims, 13 Drawing Sheets

(58) Field of Classification Search
CPC ... H04L 5/0051; H04B 7/0469; H04B 7/0478; H04B 7/0626; H04B 7/0632; H04B 7/0639; H04B 7/0456
See application file for complete search history.

(56) References Cited

U.S. PATENT DOCUMENTS

| | | | |
|---|---|---|---|
| 11,984,948 B2* | 5/2024 | Sun | H04L 5/0051 |
| 11,990,958 B2* | 5/2024 | Sun | H04B 7/0658 |
| 2023/0075037 A1* | 3/2023 | Liu | H04B 7/0456 |
| 2023/0261832 A1 | 8/2023 | Rupasinghe et al. | |
| 2023/0299914 A1* | 9/2023 | Lim | H04B 7/0639 370/329 |
| 2023/0361842 A1* | 11/2023 | Hajri | H04B 7/0639 |
| 2023/0412225 A1* | 12/2023 | Tosato | H04B 7/0658 |
| 2024/0022289 A1* | 1/2024 | Rupasinghe | H04B 7/063 |
| 2024/0022306 A1 | 1/2024 | Wang et al. | |
| 2024/0022307 A1* | 1/2024 | Yuan | H04B 7/0452 |
| 2024/0146364 A1 | 5/2024 | Liu et al. | |

FOREIGN PATENT DOCUMENTS

| | | |
|---|---|---|
| CN | 111431569 A | 7/2020 |
| WO | 2021032263 A1 | 2/2021 |

OTHER PUBLICATIONS

PCT/CN2021/092790, International Search Report and Written Opinion, Feb. 10, 2022, 9 pages.

U.S. Appl. No. 18/476,711, Non-Final Office Action, May 9, 2024, 16 pages.

U.S. Appl. No. 18/476,711, Notice of Allowance, Aug. 28, 2024, 9 pages.

* cited by examiner

| PMI Subband 0 | PMI Subband 1 | PMI Subband 2 | PMI Subband 3 |
|---|---|---|---|
| CQI Subband 0 | | | |

METHODS AND APPARATUS FOR CONFIGURING W1, W2, AND WF FOR PORT SELECTION CODEBOOK ENHANCEMENT

TECHNICAL FIELD

This application relates generally to wireless communication systems, including port selection codebook configuration.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 illustrates CQI subbands in relation to PMI subbands for $R=\frac{1}{2}$ in accordance with one embodiment.

DETAILED DESCRIPTION

Figure 1:
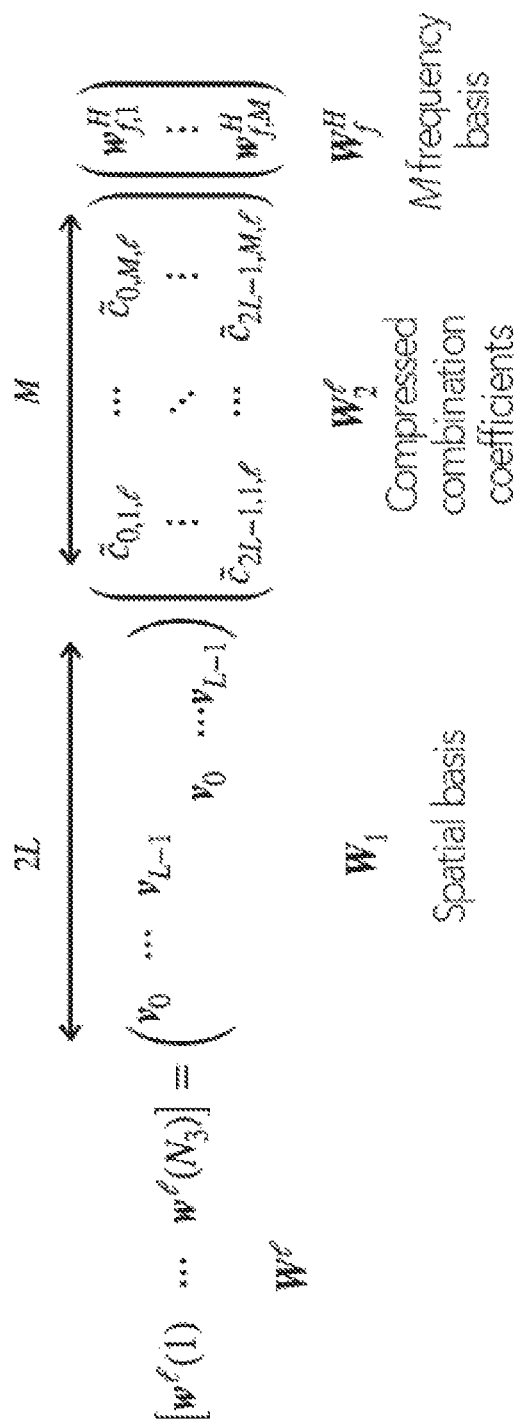
FIG. 1 illustrates a PMI matrix (codebook) used in certain embodiments herein.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Many wireless communication standards provide for the use of known signals (e.g., pilot or reference signals) for a variety of purposes, such as synchronization, measurements, equalization, control, etc. For example, in cellular wireless communications, a reference signals (RS) may be provided to deliver a reference point for downlink power. When a wireless communication device or mobile device (i.e., UE) attempts to determine downlink power (e.g., the power of the signal from a base station, such as eNB for LTE and gNB for NR), it measures the power of the reference signal and uses it to determine the downlink cell power. The reference signal also assists the receiver in demodulating the received signals. Since the reference signals include data known to both the transmitter and the receiver, the receiver may use the reference signal to determine/identify various characteristics of the communication channel. This is commonly referred to as channel estimation, which is used in many high-end wireless communications such as LTE and 5G-NR communications. Known channel properties of a communication link in wireless communications are referred to as channel state information (CSI), which provides information indicative of the combined effects of, for example, scattering, fading, and power decay with distance. The CSI makes it possible to adapt transmissions to current channel conditions, which is useful for achieving reliable communications with high data rates in multi-antenna systems.

Oftentimes multi-antenna systems use precoding for improved communications. Precoding is an extension of beamforming to support multi-stream (or multi-layer) transmissions for multi-antenna wireless communications and is used to control the differences in signal properties between the respective signals transmitted from multiple antennas by modifying the signal transmitted from each antenna according to a precoding matrix. In one sense, precoding may be considered a process of cross coupling the signals before transmission (in closed loop operation) to equalize the demodulated performance of the layers. The precoding matrix is generally selected from a codebook that defines multiple precoding matrix candidates, wherein a precoding matrix candidate is typically selected according to a desired performance level based on any of a number of different factors such as current system configuration, communication environment, and/or feedback information from the receiver (e.g., UE) receiving the transmitted signal(s).

The feedback information is used in selecting a precoding matrix candidate by defining the same codebook at both the transmitter and the receiver, and using the feedback information from the receiver as an indication of a preferred precoding matrix. In such cases the feedback information includes what is referred to as a precoding matrix index (PMI), which can be based on properties of the signals received at the receiver. For example, the receiver may determine that a received signal has relatively low signal-to-noise ratio (SNR), and may accordingly transmit a PMI that would replace a current precoding matrix with a new precoding matrix to increase the signal-to-noise ratio (SNR).

In 3GPP NR systems, two types of codebook, Type I codebook and Type II codebook, have been standardized for CSI feedback in support of advanced MIMO operations. The two types of codebook are constructed from a two-dimensional (2D) digital Fourier transform (DFT) based grid of beams, enabling CSI feedback of beam selection and phase shift keying (PSK) based co-phase combining between two polarizations. Type II codebook based CSI feedback also reports the wideband and subband amplitude information of the selected beams, allowing for more accurate CSI to be obtained. This, in turn, provides improved precoded MIMO transmissions over the network.

Under certain circumstances, the set of precoding matrix candidates that can be selected from the codebook may need to be limited. For example, the network may prevent the receiver from selecting some precoding matrix candidates while allowing it to select others. This is commonly referred to as codebook subset restriction (CBSR). CBSR may include the transmission of a CBSR bitmap from a transmitter (e.g., base station) to a receiver (e.g., UE). The CBSR bitmap typically includes a bit corresponding to each precoding matrix in the codebook, with the value of each bit (e.g., "0" or "1") indicating to the receiver whether or not the receiver is restricted from considering a corresponding precoding matrix candidate as a preferred precoding candidate to request from the base station. One disadvantage of CBSR is increased signaling overhead. For example, in some systems, the CBSR bitmap might contain a high number (e.g. 64) of bits per channel, requiring a transmitting device to transmit a relatively large amount of information to implement CBSR for all of its channels.

For multi-user multiple-in multiple-out (MIMO) systems, a base station may configure multiple UEs (e.g. two UEs) to report their precoding matrices, or precoding matrix candidates in mutually orthogonal directions. To reduce the CSI computation complexity for the UE, a base station may remove from consideration, based on uplink measurements, certain unlikely beams, thereby allowing the UE to not test the precoders formed by those beams that were removed from consideration. In other words, in order to reduce computation complexity, based on UL measurements the base station can restrict the UE to narrow down the search space, the UE therefore not having to consider the entire codebook.

For 3GPP Release-15 (Rel-15) Type II port selection codebook, a beam-formed channel state information reference signal (CSI-RS) exploits downlink (DL) and uplink (UL) channel reciprocity. For example, the base station estimates the UL channel and, based on channel reciprocity, acquires the channel state information regarding the DL channel. Then, based on the DL channel information, the base station precodes different ports in CSI-RS differently for the UE to perform further CSI reporting for CSI refinement. The UE measures CSI-RS and provides feedback to the base station. For a total number X of CSI-RS ports, X/2 ports are horizontally polarized (H-pol) and X/2 ports are vertically polarized (V-pol). L CSI-RS ports are selected out of X/2 CSI-RS ports. The first CSI-RS port may be selected every d ports (e.g., d is either 1 or 2 or 3 or 4). Then, consecutive L (e.g., 1, 2, 4) ports are selected with wrap around.

3GPP Rel-16 Type II port selection codebook enhancement uses the same port selection design as 3GPP Rel-15. When subband PMI is configured, a frequency domain DFT matrix can be used to compress the linear combination coefficients.

For Type II port selection codebook, it may be assumed that the base station will precode the CSI-RS based on channel reciprocity (i.e., DL channel estimated based on UL channel). For frequency division duplexing (FDD), exact channel reciprocity may not exist, especially when the duplexing distance is large. However, even for FDD, partial reciprocity may still exist when, for example, the angle of arrival or departure is similar between DL and UL carriers and/or the channel delay profile is similar between DL and UL carriers.

FIG. 1 illustrates a PMI matrix (codebook) used in certain embodiments herein. In the illustrated example, a Type II port selection codebook structure is given by $W^l = W_1 * W_2^l * W_f^H$ (also notated for simplicity herein as $W = W_1 * W_2 * W_f$ or W=W1W2Wf), where W is the PMI matrix, $W_1$ is a spatial basis selection matrix (also referred to herein as a port selection matrix $W_1$), $W_2$ provides compressed combination coefficients, $W_f$ is a frequency basis selection matrix, l is a layer index, $N_3$ is the number of PMI subbands, L is the number of selected ports, M is the number of frequency basis, and H denotes a Hermitian matrix or conjugate transpose operation. These and other parameters of $W^l = W_1 * W_2^l * W_f^H$ are shown in other figures and/or described in detail below.

In certain systems, for port selection codebook enhancements utilizing DL/UL reciprocity of angle and/or delay, support is provided for codebook structure $W = W_1 * W_2 * W_f$ where the port selection matrix $W_1$ is a free selection matrix, with the identity matrix as a special configuration. The frequency basis selection matrix $W_f$ is a DFT based compression matrix in which $N_3 = N_{CQISubband} * R$ and $Mv >= 1$, where R is a size of the channel quality indicator (CQI) subband divided by the size of the PMI subband, and Mv is the number of selected frequency basis. $N_3$ is the number of PMI subbands for frequency basis selection. At least one value of Mv>1 may be supported. In certain such systems, value(s) of Mv may be decided (e.g., Mv=2). In other embodiments, support of Mv>1 is a UE optional feature, taking into account UE complexity related to codebook parameters. However, candidate value(s) of R, mechanisms for configuring/indicating to the UE and/or mechanisms for selecting/reporting by UE for $W_f$ have yet to be determined. In addition, or in other systems, $W_f$ can be turned off by base station. When turned off, $W_f$ may be an all-one vector.

Embodiments herein provide port selection codebook enhancements for $W=W_1*W_2*W_f$. Certain embodiments provide designs for the port selection matrix $W_1$. In addition, or in other embodiments, designs are provided for the frequency basis selection matrix $W_f$. In addition, or in other embodiments, designs are provided for the combinational coefficient matrix $W_2$.

1. Design for Port Selection Matrix $W_1$

In certain embodiments, P CSI-RS ports are configured as channel measurement resource (CMR) for port selection codebook measurement and the base station may configure the UE to measure L CSI-RS ports out of the P CSI-RS ports, where L<=P. Of the P CSI-RS ports, P/2 ports may be H-pol and the remaining P/2 port(s) may be V-pol.

1.1 Port Selection Restrictions

In one embodiment, the base station configures the UE to measure L CSI-RS ports out of the P CSI-RS ports with one or more of the following restrictions. The UE may be configured to measure a maximum number Pmax of CSI-RS ports. For example, in one embodiment, the UE may be configured to measure Pmax=32 ports. However, in other embodiments, Pmax may be less than 32 ports or more than 32 ports.

In certain embodiments, L is an even number to account for polarization. If port selection is polarization common, the UE may select L/2 ports per P/2 CSI-RS ports per V-pol/H-pol. For example, for 32 antenna ports the UE has 32 antenna elements but there are only 16 antenna locations in a 4×4 array with H-pol and V-pol at each antenna location. To select the same number of ports per polarization, L is an even number.

In certain wireless systems, L is limited to 4 CSI-RS ports. However, in certain embodiments disclosed herein, L may be larger than 4 CSI-RS ports. For example, the UE may select 8 CSI-RS ports, 12 CSI-RS ports, 16 CSI-RS ports, 24 CSI-RS ports, or 32 CSI-RS ports.

1.2 UE Selection of CSI-RS Ports

In one embodiment, the UE is configured to select exactly L CSI-RS ports out of the P CSI-RS ports. However, selecting L CSI-RS ports may not always provide optimal performance. For example, the base station may configure the UE to measure 12 CSI-RS ports out of 32 CSI-RS ports. However, if the UE is only able to detect 8 CSI-RS ports (or determines that 8 CSI-RS ports are sufficient for current channel conditions), overhead is increased as resources may be wasted reporting 12 CSI-RS ports.

Thus, in other embodiments, the UE may select any number of k CSI-RS ports out of the P CSI-RS ports, as long as k<=L. The UE may separately report the number k and the location of the k CSI-RS ports among the P CSI-RS ports.

1.3 Port Selection Based on Polarization

As discussed above, P/2 CSI-RS ports may be transmitted with V-pol and the remaining P/2 CSI-RS ports may be transmitted with H-pol. In one embodiment, the UE selects the same number of CSI-RS ports in H-pol as it selects in V-pol. For example, if L=12, the UE may select 6 CSI-RS ports with H-pol and 6 CSI-RS ports with V-pol. In such embodiments, the number of selected ports is even.

In another embodiment, the UE may select a different number of ports in H-pol and V-pol. For example, if L=12, the UE may select 8 CSI-RS ports with H-pol and 4 CSI-RS ports with V-pol. As discussed above, the UE may select less than L ports, and the total number of selected ports may be odd. For example, if the base station configured L=12, the UE may select 4 CSI-RS ports with H-pol and 3 CSI-RS ports with V-pol.

1.4 Port Selection Based on Layer

For rank>1 and rank indicator (RI)>1, the port selection matrix $W_1$ can be either layer independent or layer common. For each layer, notation for the port selection matrix is indicated as $W_1^l$ where f is the layer index. In certain layer independent embodiments, the UE can independently report $W_1^l$. Thus, for different layers, the UE may select a different number of CSI-RS ports. The locations of the selected CSI-RS ports in different layers may be different from one another.

In certain layer common embodiments, the UE reports a single $W_1$ for all layers $W_1^1=W_1^2=,\ldots,=W_1^N$. Thus, for different layers, the UE selects the same number of ports. However, in certain such embodiments, the locations of the selected ports in different layers may be different from one another.

1.5 Port Combination Restrictions

For port selection matrix $W_1$, according to certain embodiments, the network (NW) may configure port selection restrictions to prevent the UE from selecting certain port combinations. For example, to coordinate between different UEs, a base station may prefer to have a UE report CSI-RS ports in a particular direction. If there are two UEs, the base station may divide the CSI-RS ports into subgroups and configure a first UE to report CSI-RS ports in a first subgroup and a second UE to report CSI-RS ports in a second subgroup. The subgroups may be orthogonal such that the CSI-RS ports in the first subgroup are different than the CSI-RS ports in the second subgroup.

In one embodiment, the base station provides the UE with multiple lists or bitmaps corresponding to different subsets of CSI-RS ports. For each bitmap, the UE may only select the CSI-RS ports where a corresponding bit is set to 1. The UE may select CSI-RS ports based on different bitmaps. For example, assuming 16 CSI-RS ports with a first 8 CSI-RS ports from H-pol and the last 8 CSI-RS ports from V-pol, the network may not want the UE to select certain ports in the first 4 out of 8 CSI-RS ports, together with certain CSI-RS ports in the last 4 out of 8 CSI-RS. Thus, in this example, the NW can configure a first bitmap (1111000011110000) and a second bitmap (0000111100001111) where the first UE selects CSI-RS ports from the first bitmap and the second UE selects ports from the second bitmap to avoid interference with one another.

2. Design for Frequency Basis Selection Matrix $W_f$

As discussed above, certain embodiments provide designs for the frequency basis selection matrix $W_f$, which may be combined with any of the embodiments discussed above for port selection matrix $W_1$. As discussed below, a UE may select Mv frequency basis of N frequency basis (subbands) for the frequency basis selection matrix $W_f$. The N frequency basis may also be referred to as $N_3$ frequency basis. By way of example, N may be 19, 32, or 38 in certain implementations, although other values may also be used.

2.1 Network Configuration of Mv=1

In certain embodiments, when the network configures Mv=1, the selected frequency basis is predetermined or fixed in the standard. In one embodiment, for example, the direct current (DC) frequency basis (i.e., 0 Hz frequency basis) is selected with all entries in the vector equal to one. In another embodiment, the UE selects Mv frequency basis for the frequency basis selection matrix $W_f$, and the selected frequency basis can be further reported by the UE.

2.2 Network Configuration of Mv>1

In certain embodiments, when the network configures Mv>1, only Mv=2 is supported. In other embodiments, Mv=2 or Mv=4 may be supported. The UE may be configured to indicate to the base station whether the UE supports Mv=2 and/or Mv=4 (in addition to Mv=1). In other embodiments, the UE may support other values of Mv (e.g., Mv=8).

2.3 Actual Number of Selected Frequency Basis

When the base station configures Mv>1, according to certain embodiments, the UE is configured to actually select Mv number of frequency basis. However, this may result in increased overhead.

The base station typically does not have full information of a channel (e.g., the base station may only know UL channel conditions). The DL channel conditions may be different than the UL channel conditions. The base station may assume that the channel is very frequency selective and may request that the UE measure a large number of Mv (e.g., based on a worst case estimate). However, when the UE measures the channel, the UE may determine that the frequency selectivity of the channel is different than what the base station assumes. Thus, in certain embodiments when the base station configures Mv>1, the UE may select less than or equal to Mv frequency basis. Thus, the overhead may be reduced (i.e., the dimension of the frequency basis selection matrix $W_f$ may be smaller as compared to selecting Mv frequency basis).

2.4 Frequency Basis Restriction

In certain embodiments, the network configures the exact Mv frequency basis for the UE to use. Such embodiments may be useful, for example, when using time division duplexing (TDD) where the base station may have a very good knowledge of the channel (e.g., when the UE is close to the base station). The Mv frequency basis may be restricted to be consecutive frequency basis or allowed to be non-consecutive frequency basis. The UE does not need to select the frequency basis or to feedback the frequency basis selection matrix $W_f$. Thus, overhead may be reduced.

In certain situations, however, the base station may not have a complete knowledge or estimate of the channel. Thus, the base station may be less able to accurately select the frequency basis that would be useful to the UE. In such embodiments, the network configures a subset of the frequency basis for the UE to select from, wherein the number of the frequency basis in the subset is greater than Mv. The subset may be restricted to consecutive frequency basis. In other embodiments, the subset may include non-consecutive frequency basis. The UE may report the selected frequency basis via combinatorial coefficient or bit map.

In one embodiment when the base station configures a subset of the frequency basis for the UE to select from, the UE may be restricted to at least select the DC frequency basis (i.e., frequency basis with all entries equal to one). For example, if Mv=2, the UE may select the DC frequency basis and another frequency basis. As the base station would already be aware that the UE is restricted to at least select the DC frequency basis, the UE would only report the selection of the other frequency basis. Thus, overhead may be reduced.

2.5 Association Between Mv and L

To reduce the complexity of the various combinations of selected Mv frequency basis and selected L CSI-RS ports, according to certain embodiments, the allowed configuration of Mv and L may be associated. In one embodiment, large Mv may be limited to small L. For example, Mv>=2 frequency basis may only be allowed when L is small (e.g., L=4 CSI-RS ports or 8 CSI-RS ports).

In addition, or in other embodiments, large L may be limited to small Mv. For example L≥12 CSI-RS ports may only be allowed when Mv is small (e.g., Mv=1 frequency basis).

2.6 Ratio of CQI Subbands to PMI Subbands for Frequency Basis Selection

In certain embodiments, for each CQI subband, the frequency basis may be spliced in multiple (i.e., R) subbands. The total number of PMI subbands for frequency basis selection is $N_{CQIsubband}*R$. $N_{CQIsubband}$ is the number of CQI subbands configured by the network. R is a ratio configured by the NW. As indicated above, R is a size of the CQI subband divided by the size of the PMI subband. In other words, R indicates how many PMI subbands are in each CQI subband. For example, FIG. 2 illustrates a CQI subband (CQI subband) in relation to four PMI subbands (PMI subband 0, PMI subband 1. PMI subband 2, PMI subband 3) according to one embodiment for R=4.

In one embodiment, only R=1 is supported.

In another embodiment, R=1 and R=2 are supported. R=2 may be an optional feature for UE supporting enhanced port selection codebook.

In another embodiment, R>2 is supported. R larger than 2 may be a UE optional feature for UE supporting enhanced port selection codebook.

3. Design for Combinational Coefficient Matrix $W_2$

For each layer, according to certain embodiments, when the UE selects L CSI-RS ports and Mv frequency basis, the size of the combinational coefficient matrix $W_2$ is L by Mv. Thus, there may be a total of L*Mv entries in the combinational coefficient matrix $W_2$ per layer.

In one embodiment, only a subset of the L*Mv entries in the combinational coefficient matrix $W_2$ per layer need to be reported. Thus, the network can configure a percentage, referred to as beta, of the entries for the UE to report. For example, beta=1 indicates that all L*Mv entries in the combinational coefficient matrix $W_2$ per layer are to be reported, and beta=0.5 indicates that 50% of the L*Mv entries (i.e., L*Mv/2 entries) in the combinational coefficient matrix $W_2$ per layer are to be reported. The base station assumes that the entries not reported by the UE are zero.

In addition, or in other embodiments, when the network configures a percentage, beta, of the total L*Mv entries in W2 to be reported, the UE is configured to report exactly beta*L*Mv entries. The location of the entries can be reported via bitmap. When beta=1, the UE does not report the location because all of the L*Mv entries are reported.

In another embodiment, the UE may report less than or equal to beta*L*Mv entries. For example, the UE may determine that some entries are zero and do not need to be reported. The base station assumes that the entries not reported by the UE are zero. The UE may report the location of the entries via bitmap or combinatorial coefficient. For example, the UE may first report a bitmap indicating the locations of the entries. Then, the UE may report the compressed amplitude and phase entry by entry corresponding to the bitmap locations having a value of 1.

Figure 3:
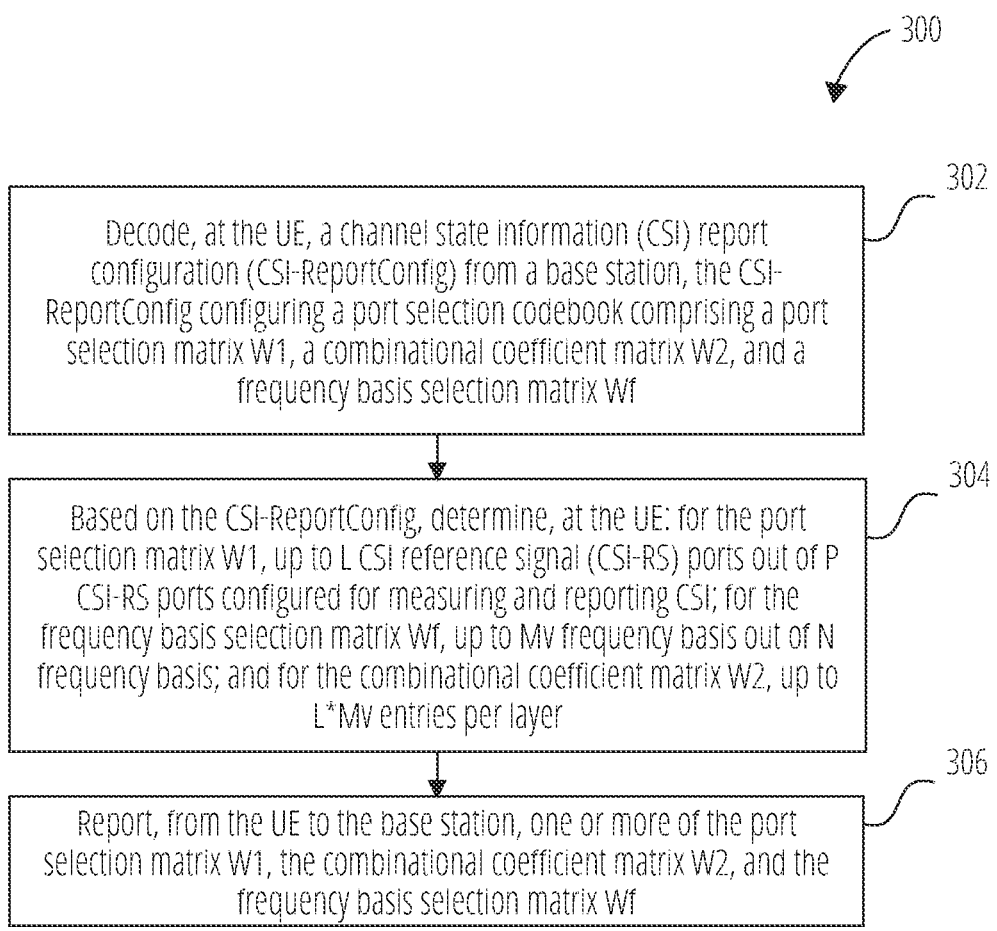
FIG. 3 illustrates a method for a UE in accordance with one embodiment.

FIG. 3 is a flowchart of a method 300 for a UE according to certain embodiments. In block 302, the method 300 includes decoding, at the UE, a channel state information (CSI) report configuration (CSI-ReportConfig) from a base station, the CSI-ReportConfig configuring a port selection codebook comprising a port selection matrix $W_1$, a combinational coefficient matrix $W_2$, and a frequency basis selection matrix $W_f$. In block 304, the method 300 includes, based on the CSI-ReportConfig, determining, at the UE: for the port selection matrix $W_1$, up to L CSI reference signal (CSI-RS) ports out of P CSI-RS ports configured for measuring and reports CSI; for the frequency basis selection matrix $W_f$, up to Mv frequency basis out of N frequency basis; and for the combinational coefficient matrix $W_2$, up to L*Mv entries per layer. In block 306, the method 300 includes reporting, from the UE to the base station, one or more of the port selection matrix $W_1$, the combinational coefficient matrix $W_2$, and the frequency basis selection matrix $W_f$.

In one embodiment of the method 300, the CSI-ReportConfig configures the UE to measure a maximum number Pmax of CSI-RS ports. Pmax may include, for example, 32 ports.

In one embodiment of the method 300, the CSI-ReportConfig configures an even number for the L CSI-RS ports, and the CSI-ReportConfig configures the UE to select L/2 horizontally polarized (H-pol) CSI-RS ports and L/2 vertically polarized (V-pol) CSI-RS ports. The even number for the L CSI-RS ports may be larger than four ports. The CSI-ReportConfig may further configure the UE to select a same number of ports from the L/2 H-pol CSI-RS ports and the L/2 V-pol CSI-RS ports. In one embodiment, the method 300 includes selecting, at the UE, a different number of ports from the L/2 H-pol CSI-RS ports and the L/2 V-pol CSI-RS ports.

In one embodiment of the method 300, the CSI-ReportConfig configures the UE to select the L CSI-RS ports out of the P CSI-RS ports. Alternatively, in one embodiment of the method 300, the CSI-ReportConfig configures the UE to select any number of k CSI-RS ports out of the P CSI-RS ports, where k<=L. In such embodiments, the UE may report to the base station the k CSI-RS ports and a location of the k CSI-RS ports among the P CSI-RS ports.

In one embodiment of the method 300, the CSI-ReportConfig configures the UE to select a same number of the L CSI-RS ports for each of a plurality of spatial layers, and the UE is configured to select a same location or a different location of the L CSI-RS ports between each of the plurality of spatial layers.

In one embodiment of the method 300, the CSI-ReportConfig configures the UE to select a different number of the L CSI-RS ports for each of a plurality of spatial layers, and the UE is configured to select a same location or a different location of the L CSI-RS ports between each of the plurality of spatial layers.

In one embodiment, the CSI-ReportConfig comprises port combination restrictions, and the method 300 further includes selecting, at the UE, the L CSI-RS ports out of the P CSI-RS ports based on the port combination restrictions. In one such embodiment, the method 300 further includes processing, at the UE, a bitmap from the base station indicating the port combination restrictions.

In one embodiment, the CSI-ReportConfig configures Mv=1, and the method 300 further includes selecting, at the UE, a direct current (DC) frequency basis for the frequency basis selection matrix $W_f$.

In one embodiment, the CSI-ReportConfig configures Mv>1, and the method 300 further includes selecting, at the UE, Mv=2 for the frequency basis selection matrix $W_f$.

In one embodiment, the CSI-ReportConfig configures Mv>1, and the method 300 further includes selecting, at the UE, Mv=2 or Mv=4 for the frequency basis selection matrix $W_f$, and reporting, from the UE to the base station, that the UE supports Mv=2 or Mv=4.

In one embodiment, the CSI-ReportConfig configures Mv>1, and the method 300 further includes selecting, at the UE, the Mv frequency basis for the frequency basis selection matrix $W_f$.

In one embodiment, the CSI-ReportConfig configures Mv>1, and the method 300 further comprising selecting, at the UE, less than or equal to the Mv frequency basis for the frequency basis selection matrix $W_f$.

In one embodiment of the method 300, the CSI-ReportConfig indicates the Mv frequency basis of the N frequency basis for the UE to use, the Mv frequency basis are consecutive or non-consecutive, and the UE does not feedback the frequency basis selection matrix $W_f$ to the base station.

In one embodiment, the CSI-ReportConfig indicates a subset of the N frequency basis for the UE to select from, a number of the frequency basis in the subset is greater than Mv, and the method 300 further includes reporting, from the UE to the base station, selected frequency basis from the subset using a combinatorial coefficient or a bitmap.

In one embodiment of the method 300, the subset is restricted to consecutive frequency basis.

In one embodiment of the method 300, the CSI-ReportConfig restricts the UE to at least select a direct current (DC) frequency basis from the subset.

In one embodiment of the method 300, the CSI-ReportConfig associates the L CSI-RS ports and the Mv frequency basis, the UE is restricted to selecting fewer of the L CSI-RS ports when selecting more of the Mv frequency basis, and the UE is restricted to selecting fewer of the Mv frequency basis when selecting more of the L CSI-RS ports.

In one embodiment of the method 300, the CSI-ReportConfig configures a total number of precoding matrix index (PMI) subbands for frequency basis selection is $N_{CQIsubband}*R$, where $N_{CQIsubband}$ is a number of channel quality indicator (CQI) subbands configured by the base station and R is a size of a CQI subband divided by a size of a PMI subband, wherein R>2.

In one embodiment of the method 300, the CSI-ReportConfig configures the UE to report a percentage, beta, of the L*Mv entries in the combinational coefficient matrix $W_2$ per layer, and wherein unreported entries are assumed to be zero. In one such embodiment, the method 300 further includes: reporting, from the UE to the base station, beta*L*Mv entries of the combinational coefficient matrix $W_2$ per layer; when beta<1, reporting, from the UE to the base station, a location of the beta*L*Mv entries using a bitmap; and when beta=1, not reporting, from the UE to the base station, the location of the beta*L*Mv entries. Alternatively, the method 300 may further include: reporting, from the UE to the base station, less than or equal to beta*L*Mv entries of the combinational coefficient matrix $W_2$ per layer; and reporting, from the UE to the base station, a location of selected and reported entries using a bitmap or a combinatorial coefficient.

Embodiments contemplated herein include an apparatus comprising means to perform one or more elements of the method 300. This apparatus may be, for example, an apparatus of a UE (such as a wireless device 1302 that is a UE, as described herein).

Embodiments contemplated herein include one or more non-transitory computer-readable media comprising instructions to cause an electronic device, upon execution of the instructions by one or more processors of the electronic device, to perform one or more elements of the method 300. This non-transitory computer-readable media may be, for example, a memory of a UE (such as a memory 1306 of a wireless device 1302 that is a UE, as described herein).

Embodiments contemplated herein include an apparatus comprising logic, modules, or circuitry to perform one or more elements of the method 300. This apparatus may be, for example, an apparatus of a UE (such as a wireless device 1302 that is a UE, as described herein).

Embodiments contemplated herein include an apparatus comprising: one or more processors and one or more computer-readable media comprising instructions that, when executed by the one or more processors, cause the one or more processors to perform one or more elements of the method 300. This apparatus may be, for example, an apparatus of a UE (such as a wireless device 1302 that is a UE, as described herein).

Embodiments contemplated herein include a signal as described in or related to one or more elements of the method 300.

Embodiments contemplated herein include a computer program or computer program product comprising instructions, wherein execution of the program by a processor is to cause the processor to carry out one or more elements of the method 300. The processor may be a processor of a UE (such as a processor(s) 1304 of a wireless device 1302 that is a UE, as described herein). These instructions may be, for example, located in the processor and/or on a memory of the UE (such as a memory 1306 of a wireless device 1302 that is a UE, as described herein).

Figure 4:
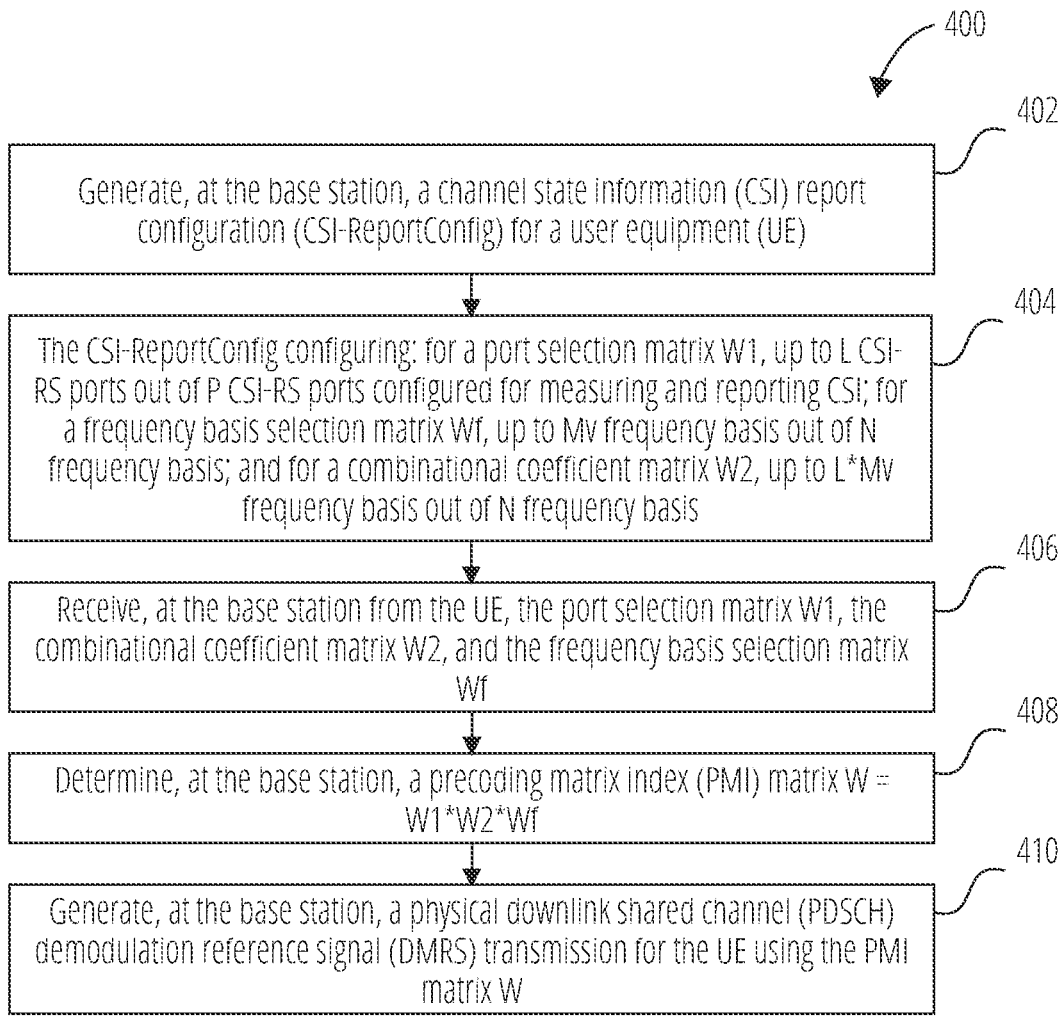
FIG. 4 illustrates a method for a base station in accordance with one embodiment.

FIG. 4 is a flowchart of a method 400 for a base station according to certain embodiments. In block 402, the method 400 includes generating, at the base station, a channel state information (CSI) report configuration (CSI-ReportConfig) for a user equipment (UE). In block 404, the CSI-ReportConfig configures: for a port selection matrix $W_1$, up to L CSI reference signal (CSI-RS) ports out of P CSI-RS ports configured for measuring and reports CSI; for a frequency basis selection matrix $W_f$, up to Mv frequency basis out of N frequency basis; and for a combinational coefficient matrix $W_2$, up to L*Mv entries per layer. In block 406, the method 400 includes receiving, at the base station from the UE, the port selection matrix $W_1$, the combinational coefficient matrix $W_2$, and the frequency basis selection matrix $W_f$. In block 408, the method 400 includes determining, at the base station, a precoding matrix index (PMI) matrix $W=W_1*W_2*W_f$. In block 410, the method 400 includes generating, at the base station, a physical downlink shared channel (PDSCH) demodulation reference signal (DMRS) transmission for the UE using the PMI matrix W.

In one embodiment of the method 400, the CSI-ReportConfig configures the UE to measure a maximum number Pmax of CSI-RS ports. **The method of claim 30, wherein Pmax=32 ports.

In one embodiment of the method 400, the CSI-ReportConfig configures an even number for the L CSI-RS ports, and the CSI-ReportConfig configures the UE to select L/2 horizontally polarized (H-pol) CSI-RS ports and L/2 vertically polarized (V-pol) CSI-RS ports. In certain such embodiments, the even number for the L CSI-RS ports is larger than four ports. In one embodiment, the CSI-ReportConfig configures the UE to select a same number of ports from the L/2 H-pol CSI-RS ports and the L/2 V-pol CSI-RS ports. Alternatively, the CSI-ReportConfig configures the UE to select a different number of ports from the L/2 H-pol CSI-RS ports and the L/2 V-pol CSI-RS ports.

In one embodiment of the method 400, the CSI-ReportConfig configures the UE to select the L CSI-RS ports out of the P CSI-RS ports.

In one embodiment of the method 400, the CSI-ReportConfig configures the UE to select any number of k CSI-RS ports out of the P CSI-RS ports, where k<=L. The CSI-ReportConfig may further configure the UE to report the k CSI-RS ports and a location of the k CSI-RS ports among the P CSI-RS ports.

In one embodiment of the method 400, the CSI-ReportConfig configures the UE to select a same number of the L CSI-RS ports for each of a plurality of spatial layers, and the CSI-ReportConfig configures the UE to select a same location or a different location of the L CSI-RS ports between each of the plurality of spatial layers.

In one embodiment of the method 400, the CSI-ReportConfig configures the UE to select a different number of the L CSI-RS ports for each of a plurality of spatial layers, and the CSI-ReportConfig configures the UE to select a same location or a different location of the L CSI-RS ports between each of the plurality of spatial layers.

In one embodiment of the method 400, the CSI-ReportConfig comprises port combination restrictions, and the CSI-ReportConfig configures the UE to select the L CSI-RS ports out of the P CSI-RS ports based on the port combination restrictions. The method 400 may further include generating, at the base station, a bitmap indicating the port combination restrictions.

In one embodiment of the method 400, the CSI-ReportConfig configures Mv=1, and the CSI-ReportConfig configures the UE to select a direct current (DC) frequency basis for the frequency basis selection matrix $W_f$.

In one embodiment of the method 400, the CSI-ReportConfig configures Mv>L, and the CSI-ReportConfig configures the UE to select Mv=2 for the frequency basis selection matrix $W_f$.

In one embodiment, in response to an indication from the UE that the UE supports Mv=2 or Mv=4, the method 400 further includes configuring the UE to select Mv=2 or Mv=4 for the frequency basis selection matrix $W_f$.

In one embodiment of the method 400, the CSI-ReportConfig configures Mv>L, and the CSI-ReportConfig configures the UE to select the Mv frequency basis for the frequency basis selection matrix $W_f$.

In one embodiment of the method 400, the CSI-ReportConfig configures Mv>L, and the CSI-ReportConfig configures the UE to select less than or equal to the Mv frequency basis for the frequency basis selection matrix $W_f$.

In one embodiment of the method 400, the CSI-ReportConfig indicates the Mv frequency basis of the N frequency basis for the UE to use, the Mv frequency basis are consecutive or non-consecutive, and the base station does not receive feedback from the UE for the frequency basis selection matrix $W_f$.

In one embodiment of the method 400, the CSI-ReportConfig indicates a subset of the N frequency basis for the UE to select from, wherein a number of the frequency basis in the subset is greater than Mv, and wherein the CSI-ReportConfig configures the UE to report selected frequency basis from the subset using a combinatorial coefficient or a bitmap. The subset may be restricted to consecutive frequency basis. In certain embodiments, the CSI-ReportConfig restricts the UE to at least select a direct current (DC) frequency basis from the subset.

In one embodiment of the method 400, the CSI-ReportConfig associates the L CSI-RS ports and the Mv frequency basis, where the UE is restricted to selecting fewer of the L CSI-RS ports when selecting more of the Mv frequency basis, and where the UE is restricted to selecting fewer of the Mv frequency basis when selecting more of the L CSI-RS ports.

In one embodiment of the method 400, the CSI-ReportConfig configures a total number of precoding matrix index (PMI) subbands for frequency basis selection is $N_{CQIsubband}*R$, where $N_{CQIsubband}$ is a number of channel quality indicator (CQI) subbands configured by the base station and R is a size of a CQI subband divided by a size of a PMI subband, wherein R>2.

In one embodiment of the method 400, the CSI-ReportConfig configures the UE to report a percentage, beta, of the L*Mv entries in the combinational coefficient matrix $W_2$ per layer, and wherein the base station assumes that unreported entries are zero. In certain such embodiments, the method 400 further includes: receiving a first report, from the UE, including beta*L*Mv entries of the combinational coefficient matrix $W_2$ per layer; when beta<1, receiving a second report, from the UE, including a location of the beta*L*Mv entries using a bitmap; and when beta=1, not receiving the second report from the UE. Alternatively, in another embodiment, the method 400 further includes: receiving a first report, from the UE, including the selected entries of the combinational coefficient matrix $W_2$ per layer; receiving a second report, from the UE, including a location of the selected entries using a bitmap; the number of the selected entries can be less than or equal to beta*L*Mv.

Embodiments contemplated herein include an apparatus comprising means to perform one or more elements of the method 400. This apparatus may be, for example, an apparatus of a base station (such as a network device 1318 that is a base station, as described herein).

Embodiments contemplated herein include one or more non-transitory computer-readable media comprising instructions to cause an electronic device, upon execution of the instructions by one or more processors of the electronic device, to perform one or more elements of the method 400. This non-transitory computer-readable media may be, for example, a memory of a base station (such as a memory 1322 of a network device 1318 that is a base station, as described herein).

Embodiments contemplated herein include an apparatus comprising logic, modules, or circuitry to perform one or more elements of the method 400. This apparatus may be, for example, an apparatus of a base station (such as a network device 1318 that is a base station, as described herein).

Embodiments contemplated herein include an apparatus comprising: one or more processors and one or more computer-readable media comprising instructions that, when executed by the one or more processors, cause the one or more processors to perform one or more elements of the method 400. This apparatus may be, for example, an apparatus of a base station (such as a network device 1318 that is a base station, as described herein).

Embodiments contemplated herein include a signal as described in or related to one or more elements of the method 400.

Embodiments contemplated herein include a computer program or computer program product comprising instructions, wherein execution of the program by a processing element is to cause the processing element to carry out one or more elements of the method 400. The processor may be a processor of a base station (such as a processor(s) 1320 of a network device 1318 that is a base station, as described herein). These instructions may be, for example, located in the processor and/or on a memory of the base station (such as a memory 1322 of a network device 1318 that is a base station, as described herein).

Figure 5:
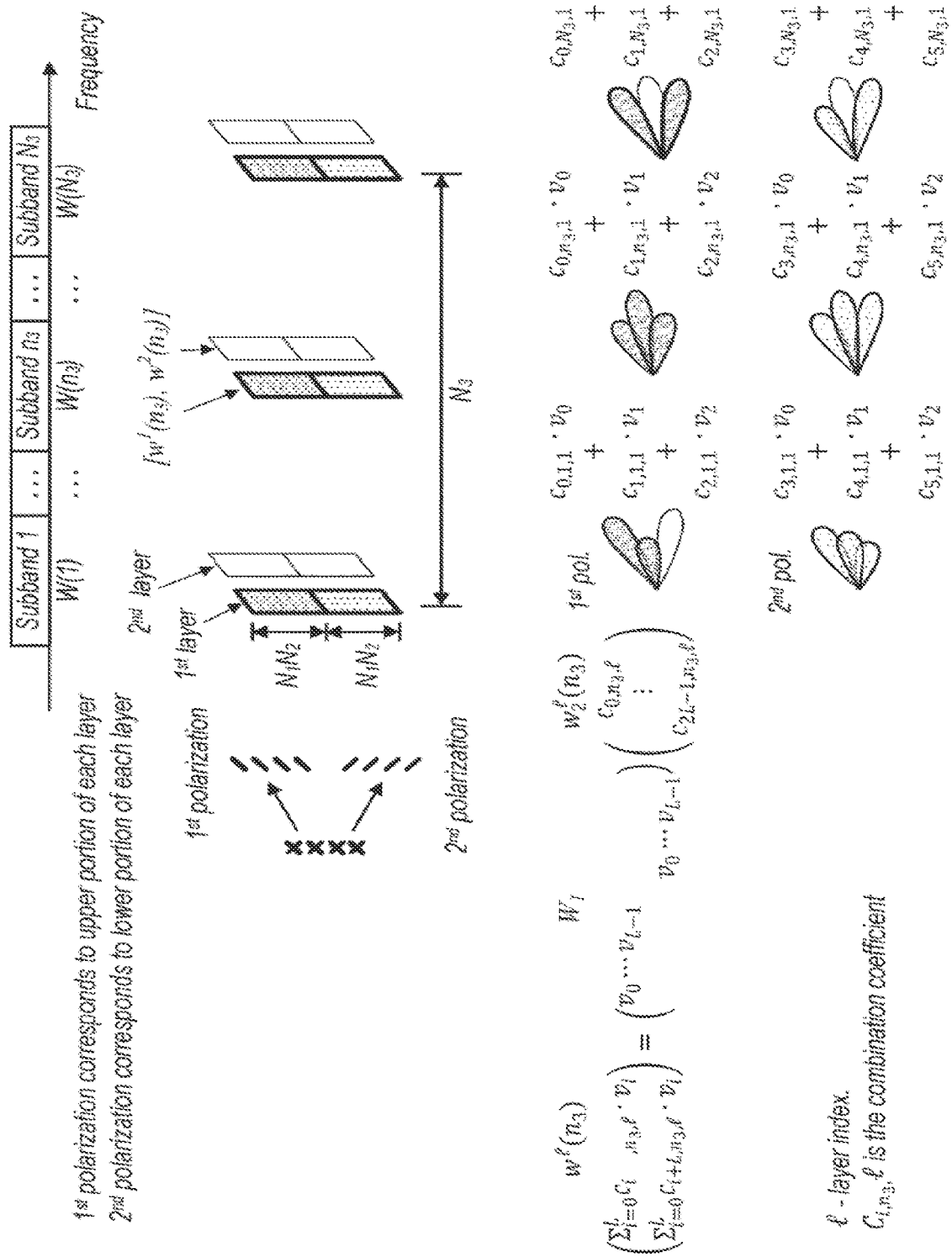
FIG. 5 shows an exemplary diagram illustrating the precoding structure associated with Type II CSI reporting, which may be used with certain embodiments.

FIG. 5 shows an exemplary diagram illustrating the precoding structure associated with Type II CSI reporting, which may be used with certain embodiments. The CSI may be reported to the base station to indicate which precoding is preferred by the UE. In Type II reporting, the precoding matrix is reported for each band, and is represented by a linear combination of a set of a specified number L of DFT vectors representing each column. As discussed herein, L corresponds to the number of selected ports. As illustrated in FIG. 5, there may be a specified number $N_3$ subbands (or $N_3$ PMI subbands), with a corresponding precoding matrix W for each subband. Each precoding matrix includes two columns, $w^1$ and $w^2$. Each column corresponds to the precoding vector for one layer. For each layer, the precoding vector may be further divided into two parts, a first polarization and second polarization. The L DFT vectors are common for all subbands and are used in subband-specific combinations. Specifically, each column vector is a weighted summation of the L vectors. The weighting (or combination) coefficients for the combination/combined weight are indicated in FIG. 5 by $c_0$, $c_1$, and $c_2$. As indicated in the example of FIG. 5, $v_0$, $v_1$, and $v_2$ represent three DFT vectors. The UE reports to the base station, which three DFT vectors are preferred.

Figure 6:
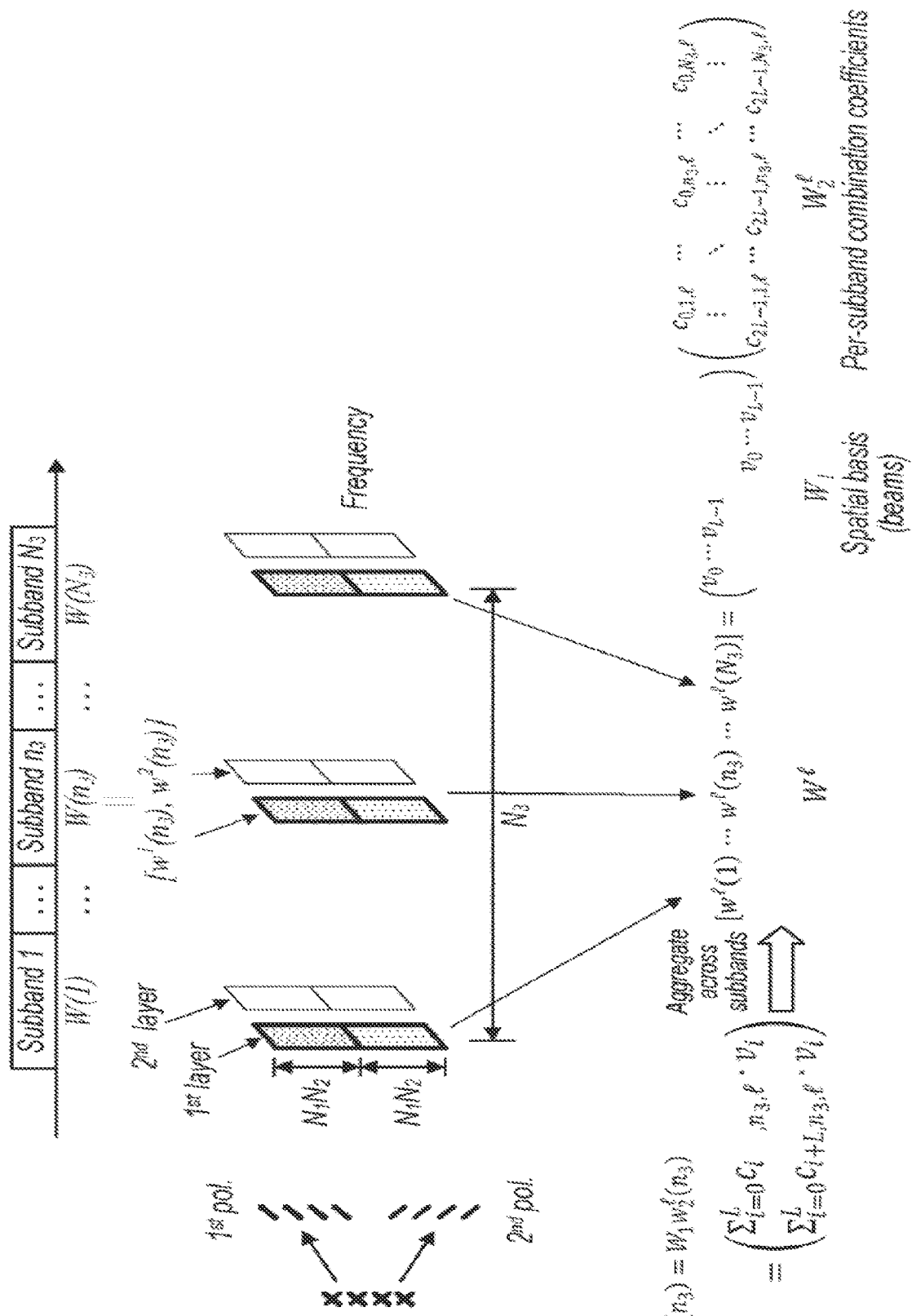
FIG. 6 shows an exemplary diagram illustrating the reporting structure used by the UE to report back to the base station, which may be used with certain embodiments.

FIG. 6 shows an exemplary diagram illustrating the reporting structure used by the UE to report back to the base station, which may be used with certain embodiments. Each subband has its own corresponding set of combination coefficients, and eventually the UE reports the combination coefficients. When considering the reporting by the UE, the Type II overhead is dominated by the subband combination coefficient. According to the information shown in FIG. 6, the total number of entries is $2L \times N_3$, there are multi-bits for amplitude and there are multi-bits for phase. In one example, in a worst case scenario, there may be 19 subbands, 32 transmit (TX) ports, and a CSI payload size of more than 1200 bits. Therefore, it would be beneficial to reduce the Type II CSI overhead.

Figure 7:
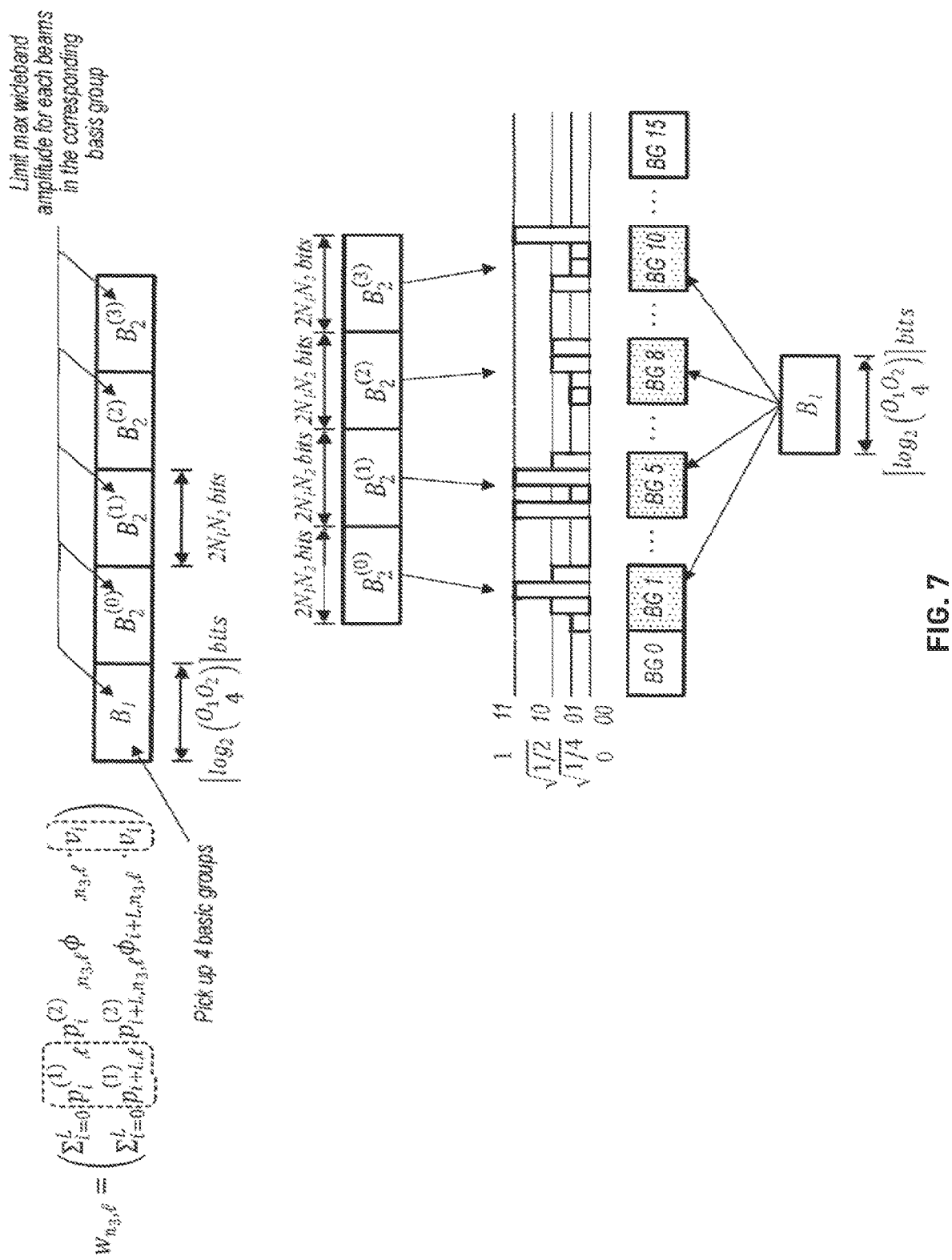
FIG. 7 shows an exemplary diagram illustrating CBSR associated with Type II CSI reporting, which may be used with certain embodiments.

FIG. 7 shows an exemplary diagram illustrating CBSR associated with Type II CSI reporting, which may be used with certain embodiments. FIG. 7 provides an indication of how CBSR is configured. Overall, a bit sequence is provided to the UE. The bit sequence includes two parts, and each sequence indicates the maximum allowed magnitude for the DFT beams. Accordingly, $O_1O_2$ beam groups are divided into two categories, restricted or unrestricted. For the basis in an unrestricted beam group, the wideband amplitude is not restricted (e.g., it may have eight different values). For the basis in a restricted beam group, a maximum allowed wideband amplitude is configured (e.g., it may have four different values). That is, the restriction is on a spatial basis. Four spatial basis groups are selected and the maximum wideband amplitude for each beam in the corresponding basis group is limited.

As indicated in FIG. 7, there may be two antennas in the vertical dimension (number $[N_1]$ of antennas=2) and two antennas in the horizontal direction (number $[N_2]$ of antennas=2), yielding sixteen beam groups (BGs). The base station selects four out of the sixteen BGs for consideration. In the example shown. BG 1, BG 5, BG 8, and BG 10 are selected. Selection of these four beam groups is indicated by the first bit sequence, $B_1$. For each beam group, the base station further signals the UE a short sequence containing eight bits. The eight bits are divided into four groups, each group corresponding to one beam in this group. The four groups are shown in FIG. 7 as $B_2^{(0)}$, $B_2^{(1)}$, $B_2^{(2)}$, and $B_2^{(3)}$, which can indicate four different maximum amplitude levels. There are four beams in each group, and each beam can indicate the maximum allowed power that the UE may consider in reporting CSI. The maximum amplitude may thereby be controlled for spatial beams. Thus, shown in FIG. 7. CBSR restricts beam groups BG 1, BG 5, BG 8, and BG 10, with each group consisting of an $N_1N_2$ basis, with the maximum wideband amplitude configured for each beam in each restricted beam group.

Figure 8:
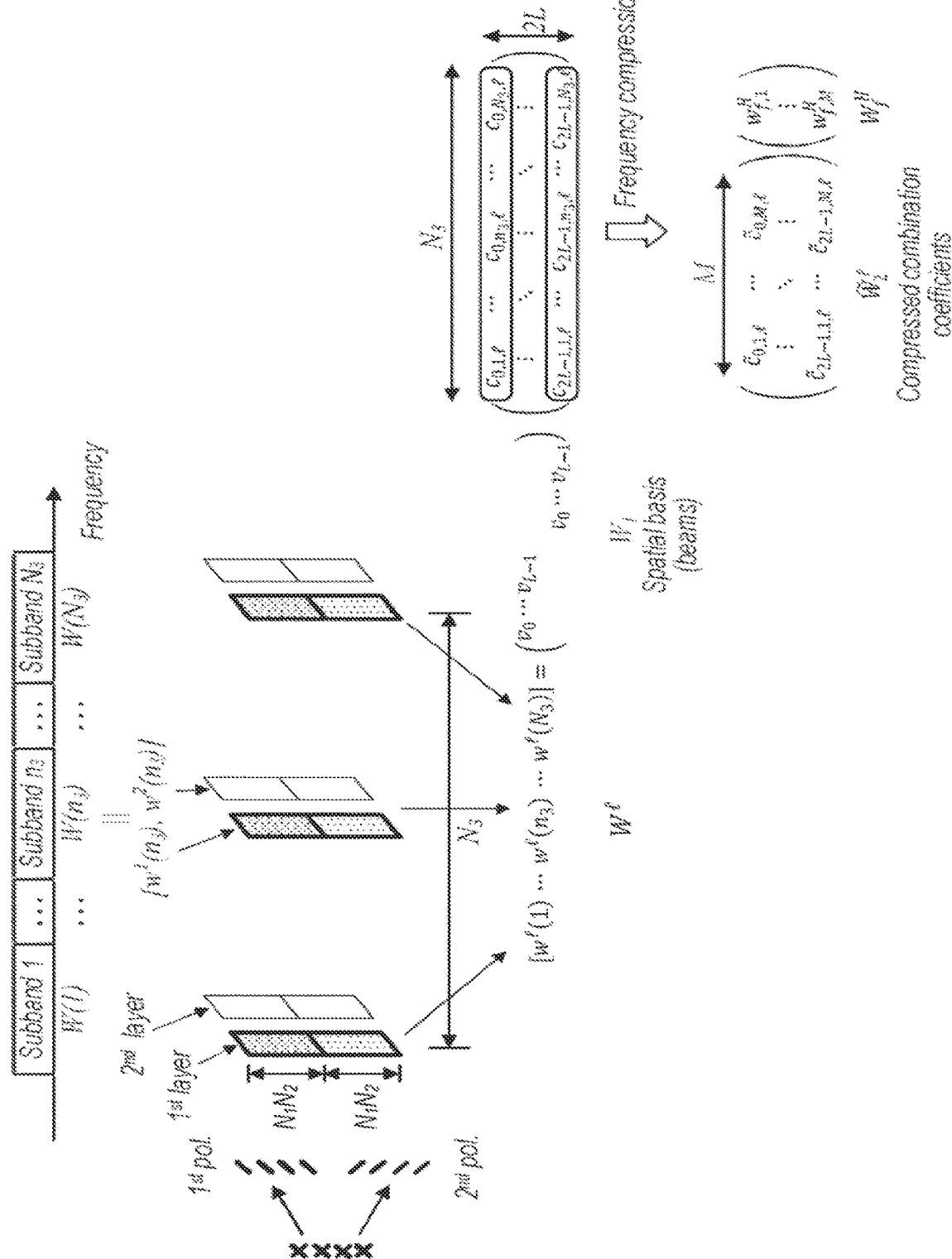
FIG. 8 shows an exemplary diagram illustrating CBSR associated with Type II CSI reporting, which may be used with certain embodiments.

FIG. 8 shows an exemplary diagram illustrating CBSR associated with Type II CSI reporting, which may be used with certain embodiments. As previously mentioned, overhead may consume substantial uplink bandwidth. In some embodiments, in order to reduce overhead, frequency compression of the combination (or weighting) coefficients may be introduced. Therefore, in addition to spatial basis considerations (previously described), frequency basis may also be considered. If a channel is less frequency-selective, neighboring coefficients may exhibit similarity. For example, $\{c_{i,n3,1}\}_{n3=1}^{N3}$ are correlated. That is, the combination coefficients across the frequency may have some correlation (they may be correlated across the frequency). If this correlation is extracted to enable decorrelation, then the coefficients may be presented by a small set of frequency bases, $W_f$. Therefore, the overhead may be reduced by compressing the combination coefficient ($\{c_{i,n31}\}_{n3=1}^{N3}$) across the frequency dimension. Each coefficient may then be based on M bases, where M represents the corresponding number of bases and is less than $N_3$, that is, $M<N_3$. This allows the UE to report a small number of combination coefficients while also reporting the frequency basis (or bases) to have the base station reconstruct the first subband combination coefficients. Coding vectors may therefore be presented not only in the spatial dimension but also in frequency dimension. As noted in FIG. 8, $W_1$ represents the spatial basis column (which may also be referred to herein as a port selection matrix), $W_2$ provides combination coefficients across the selected ports for the N3 PMI subbands, and $W_f$ represents the frequency basis column.

The UE may be restricted from reporting CSI based on a subset of frequency bases per base station configuration, in addition to a spatial basis restriction per the base station configuration. In some embodiments, the maximum allowed amplitude may be separately configured for a spatial basis and for a frequency basis, yielding a separate maximum allowed amplitude based on spatial consideration and a separate maximum allowed amplitude based on frequency consideration. The maximum allowed amplitude may be layer specific, i.e., each layer may be configured with a different maximum allowed amplitude for different ranks. At least three different combinations of spatial/frequency basis consideration may be implemented. In a first implementation, a UE may be configured with restricted spatial basis dependent amplitude and unrestricted frequency basis dependent amplitude. In a second implementation, the UE may be configured with restricted frequency basis dependent amplitude and unrestricted spatial basis dependent amplitude. Finally, in a third implementation, the UE may be configured with both restricted spatial basis dependent amplitude and restricted frequency basis dependent amplitude.

Separate Spatial and Frequency Restrictions.

In some embodiments, both the maximum allowed amplitude for spatial basis and the maximum allowed amplitude for frequency basis may be configured. This may be implemented in a variety of different embodiments which may be grouped into three different alternatives. In a first alternative, the amplitude of each coefficient may be represented by at most three components, as expressed by the equation $c_{i,m,1}=P_{i,1}^{(1)}P_{m,1}^{(2)}P_{m,1}^{(3)}\cdot\emptyset_{i,m,1}$, where the three components are: a spatial basis dependent amplitude ($P_{i,1}^{(1)}$); a frequency basis dependent amplitude ($P_{m,1}^{(3)}$); and an amplitude dependent on both spatial basis and frequency basis ($P_{i,m,1}^{(2)}$); where ($P_{i,1}^{(1)}$) and ($P_{i,1}^{(1)}$) may not exceed the configured maximum allowed value(s), respectively. In a second alternative, the amplitude of each coefficient may be represented by a single component $P_{i,m,1}$, where $P_{i,m,1}$ may not exceed the maximum allowed value configured for the corresponding spatial basis (or bases), and may also not exceed the maximum allowed value configured for the corresponding frequency basis (or bases). In a third alternative, the amplitude of each coefficient may be represented by a single component $P_{i,m,1}$, where $P_{i,m,1}$ may not exceed the product of the maximum allowed values configured for the corresponding spatial basis (or bases) and frequency basis (or bases).

Figure 9:
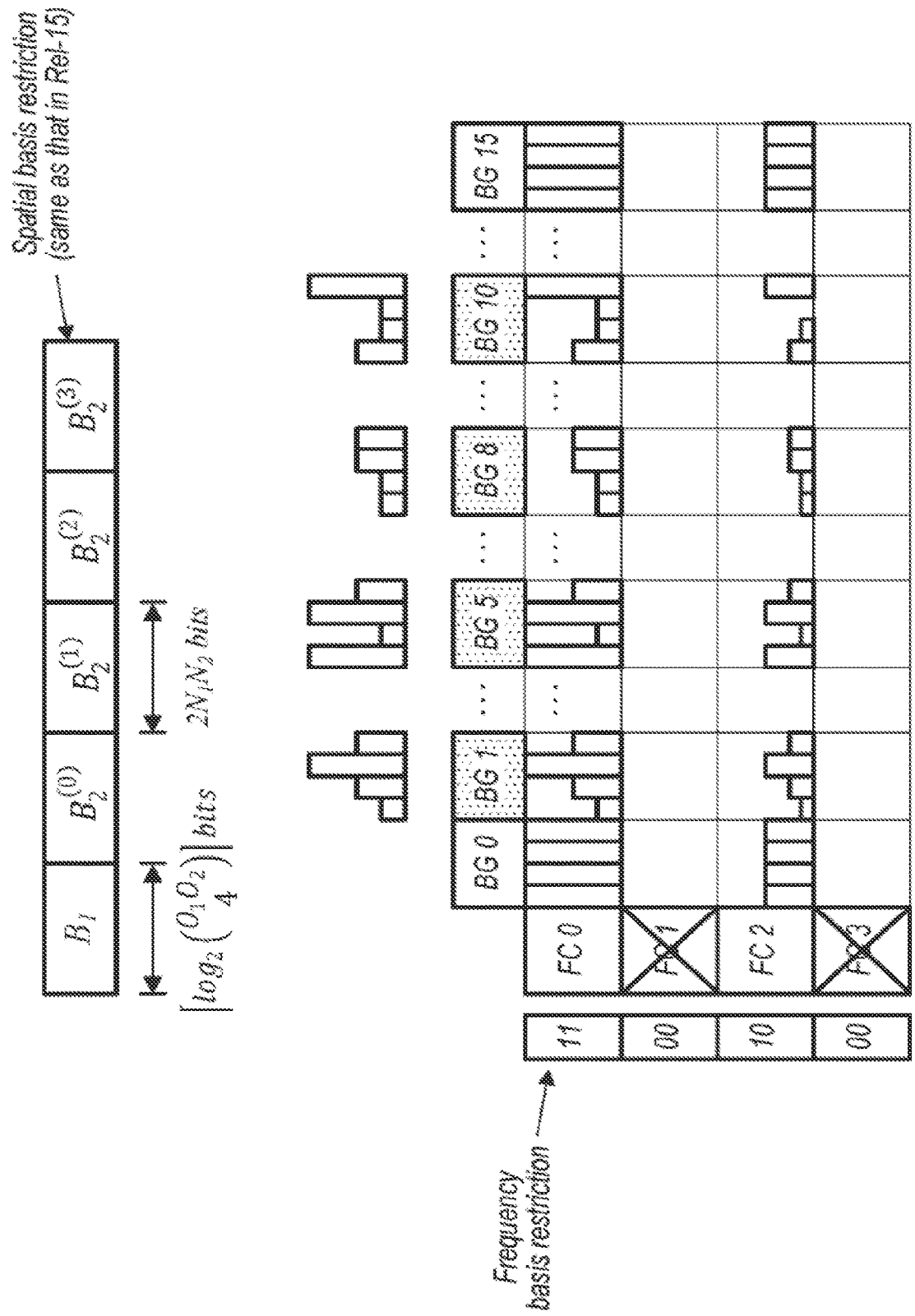
FIG. 9 shows a diagram illustrating one example of separate spatial basis and frequency basis restrictions, according to some embodiments.

FIG. 9 shows a diagram illustrating one example of separate spatial basis and frequency basis restrictions, according to some embodiments. In embodiments exemplified in FIG. 9, a 2-bit indication may be provided to the UE by the base station for each frequency component. That is, for each frequency basis (FC), a 2-bit amplitude restriction may be configured. When the amplitude is set to zero for a given frequency component, the given frequency component is restricted entirely. In other words, the given frequency component may not be considered for CSI (or PMI) reporting by the UE. As shown in FIG. 9, for FC 0, the amplitude restriction is 1, for FC 2, the amplitude restriction is ½, and FCs 1 and 3 are entirely restricted from CSI reporting. In the bottom diagram of FIG. 9, the frequency basis restriction is indicated on the vertical axis while the spatial basis restriction is indicated on the horizontal axis. In certain embodiments, beam groups 1, 5, 8, and 10 are restricted on a spatial basis.

Joint Spatial-Frequency Restriction.

Figure 10:
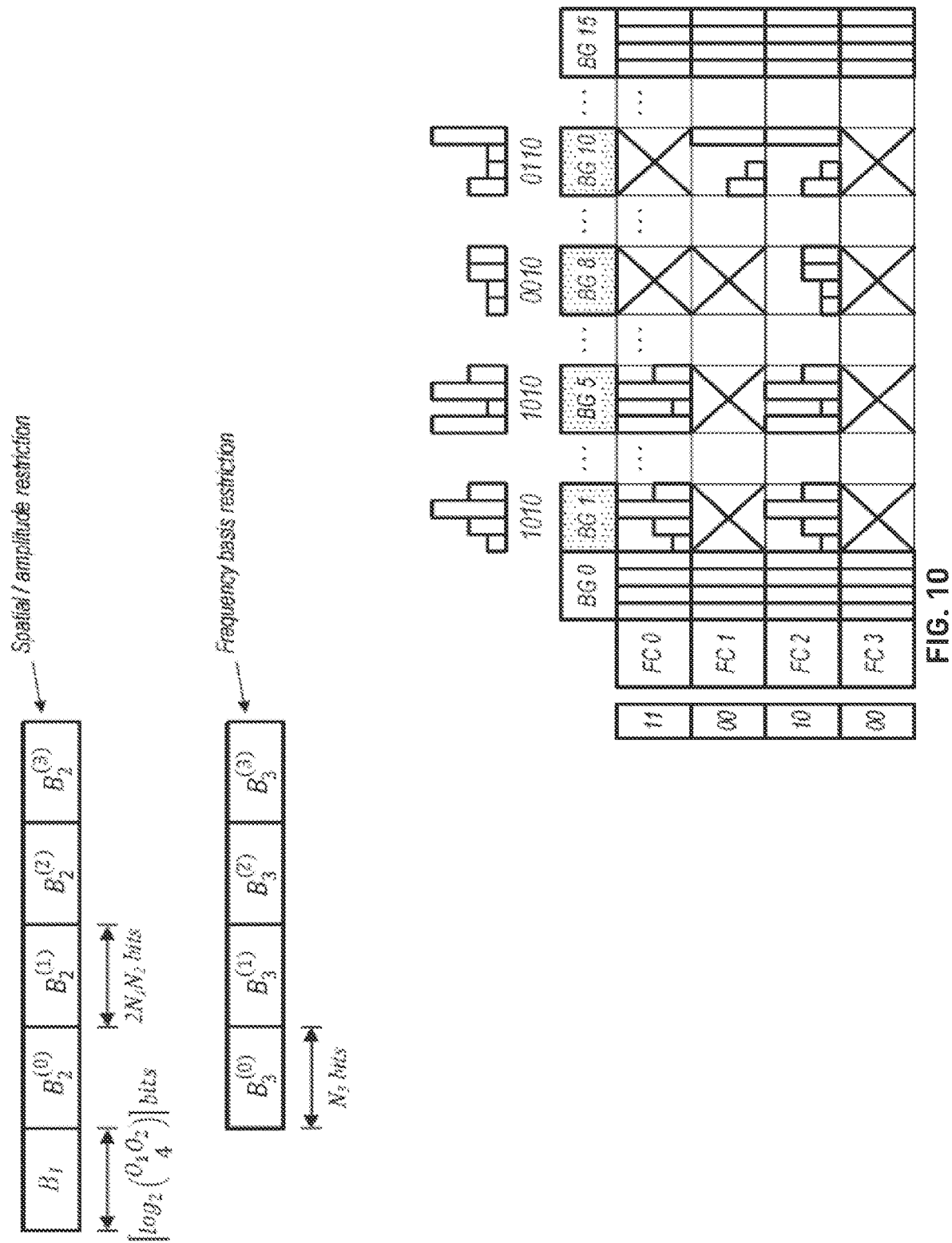
FIG. 10 shows a diagram illustrating one example of joint spatial-frequency restriction, according to some embodiments.

FIG. 10 shows a diagram illustrating one example of joint spatial-frequency restriction, according to some embodiments. As illustrated in FIG. 10, a UE may be restricted from reporting a subset of combinations of spatial and frequency bases per base station configuration. In such a case the UE may be configured with a subset of spatial basis groups, with a set of frequency basis restriction configured for each spatial basis group. When a frequency basis is restricted, it may not be considered (by the UE) for CSI reporting with the associated spatial basis. For each spatial basis group, a maximum allowed amplitude may be configured for each basis in the group. That is, a maximum allowed amplitude may be indicated for each combination. For each beam group, the frequency component to be used may also be indicated. For maximum amplitude, the configuration for the beam groups may still be followed.

In the example shown in FIG. 10, for each restricted spatial beam group, a specific frequency basis restriction is configured. On the other hand, for spatial basis groups without restriction, the frequency basis is not restricted. In contrast to the example shown in FIG. 9, where frequency bases 1 and 3 were restricted completely (regardless of spatial basis), in the example of FIG. 10, spatially unrestricted beam groups 0 and 15 are not frequency restricted. However, as indicated by the respective frequency basis restriction for each spatially restricted beam group (1, 5, 8, and 10), each spatially restricted beam group may also have a frequency basis restriction applied as shown.

In some embodiments, frequency basis restriction and spatial basis restriction may not be applied simultaneously. That is, restriction may be either on a spatial basis or a frequency basis, depending on certain parameters. For example, the applicability of spatial/frequency restriction may be dependent on the spatial/frequency granularity. Considering the number ($N_1$, $N_2$) of transmit ports or antennas, a smaller number of antennas (e.g. $N_1$ and $N_2$ are both either equal to or lower than four) may suggest wider spatial beams and less PMI hypotheses, for which a spatial basis restriction may be less efficient, and therefore a frequency basis restriction may be preferred. Thus, in some embodiments, for CBSR, a frequency basis restriction may be provided by the base station to the UE but not a spatial basis restriction. On the other hand, a larger number of antennas (e.g. $N_1$ and $N_2$ are both either equal to or larger than 8) may suggest narrow spatial beams and more PMI hypotheses, for which each spatial beam may correspond to a single frequency basis, therefore a spatial basis restriction may be sufficient. Thus, in some embodiments, for CBSR, a spatial basis restriction may be provided by the base station to the UE but not a frequency basis restriction. Thus, frequency basis restriction may be supported for some combination of (N1, N2), and the configuration of frequency basis restriction may be at least partially based on the value of (N1, N2).

Configuring the Number of Frequency Bases for Enhanced Type II CSI Reporting.

Figure 11:
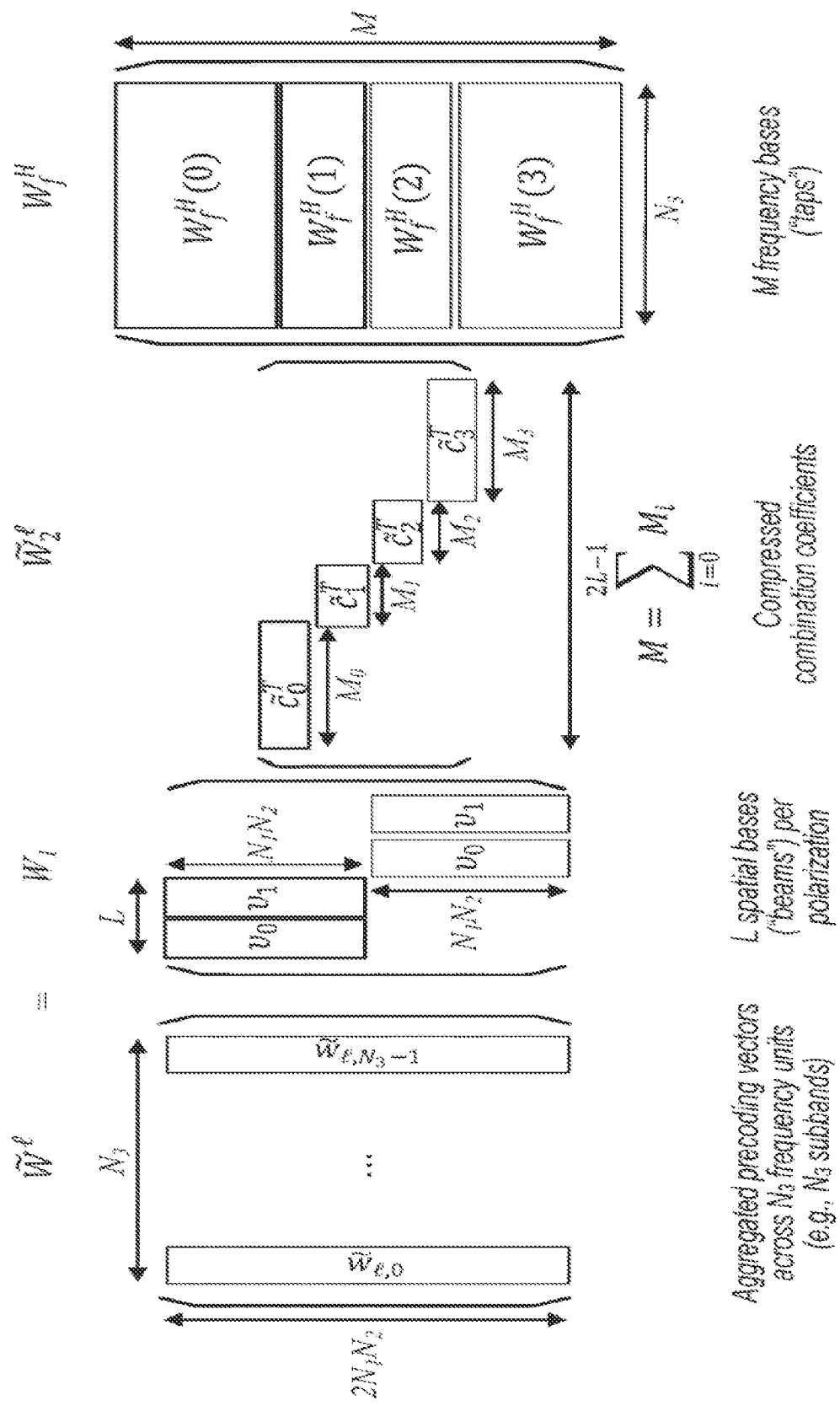
FIG. 11 shows a diagram of an exemplary precoder structure with frequency compression, according to some embodiments.

As previously mentioned, in some embodiments, the frequency basis may be beam specific. For example, frequency basis may be considered for different polarizations and for different spatial beams. FIG. 11 shows a diagram of an exemplary precoder structure with frequency compression, according to some embodiments. The equation in FIG. 11 represents the aggregated precoding vector for the lth layer. In the exemplary configuration shown in FIG. 11, there are L spatial bases (or beams) per polarization, with L=2 and the spatial bases (per polarization) denoted by $v_0$ and $v_1$, respectively. As shown in FIG. 11, $v_0$ represents the first spatial beam (or spatial basis) of the first polarization with corresponding number $M_0$ frequency bases. The second spatial beam (or spatial basis) $v_1$ in the first polarization may have a smaller corresponding number $M_1$ of frequency bases. Similarly, $v_0$ for the second polarization has a corresponding number $M_2$ of frequency bases, and $v_1$ for the second polarization has a corresponding number $M_3$ of frequency bases. That is, $M_0$ represents the number of frequency bases corresponding to $v_0$ in the first polarization, $M_1$ represents the number of frequency bases corresponding to $v_1$ in the first polarization, $M_2$ represents the number of frequency bases corresponding to $v_0$ in the second polarization, and $M_3$ represents the number of frequency bases corresponding to $v_1$ in the second polarization. Upon determining the respective values of $M_0$, $M_1$, $M_2$ and $M_3$, the value of M may be obtained, which corresponds to the (horizontal) dimension of the $W_2$ matrix. Accordingly, M (or the value of M) also represents the number of overall frequency bases (or vertical dimension) of the $W_f$ matrix. $N_3$ (or the value of $N_3$) represents the number of frequency units (e.g. the number of PMI subbands).

For each ith spatial basis, the corresponding combination coefficient is a linear combination of the corresponding number $M_i$ of frequency bases. The value of $M_i$ maybe selected by the UE and reported in CSI, or it may be configured in the UE by the base station via higher-layer (e.g., RRC) signaling. In some embodiments, referred to as explicit configuration, the base station may configure the value in the UE via dedicated radio resource control (RRC) signaling. For example, the UE may obtain the value of $M_i$ explicitly from the base station via dedicated higher-layer (e.g. RRC) signaling. In some embodiments, referred to as implicit configuration, the value may be derived by the UE from some other RRC parameters based on specified, predefined rules.

In a first implementation, the value of $M_i$ may be a function of the number of ports in both dimensions (vertical and horizontal). That is, the value of $M_i$ may be a function of ($N_1$, $N_2$). A large number of $N_1$ and $N_2$ (equal to or greater than eight, for example) may result in a narrower spatial beam, and a small Mi value may therefore be sufficient.

In a second implementation, the frequency dimension may be considered. Here the UE may be required to report a large number of subbands. The value of $M_i$ may be a function of $N_3$. A large $N_3$ value may result in more resolvable paths, therefore a large $M_i$ value may be preferable. E.g., $M_i=f_2(N_3)$.

In a third implementation, both spatial and frequency considerations may be taken into account. In this case the value of $M_i$ may be a function of ($N_1$, $N_2$, $N_3$), and the spatial-temporal granularity may be jointly considered. E.g., $M_i=f_3$ (max ($N_1$, $N_2$), $N_3$).

Configuring PMI Frequency Compression Units for Enhanced NR Type II CSI.

Referring again to FIG. 8, consideration may be given to determining the length of the frequency basis. In practical terms this leads to determining how to choose the dimension of the $W_f$ matrix. It should be noted that there is a clear relationship between the frequency and the time domain (Fourier Transform), which makes it possible to use a Fast Fourier Transform (FFT). For example if the UE is required to report CSI for a specified number (e.g., five) of subbands, then the column of $W_f$ may have a corresponding same number (in this example five) entries. The value for each subband may be obtained. In proposed systems, the number of resource blocks (RBs) may range from 1 to 275 (as an example of the wider range). Thus, FFT may be supported for this range. A relationship/link may be established between the number of CSI frequency units and the FFT size for the dimension of $W_f$.

The frequency basis in $W_f$ may be a subset of DFT vectors. The dimension of the frequency basis may thus equal to the number of CSI frequency units (e.g., the number of subbands as indicated in the CSI reporting band). The number of subbands may be any integer in a specified range, for example in the range of 1 to 19, according to current 3GPP specifications. For finer PMI frequency units, the dimension of the frequency basis may vary in a much wider range, e.g. from 1 to hundreds. As mentioned above, the frequency compression may be implemented through FFT. In order to facilitate the implementation, the dimension of the frequency basis (e.g., FFT size) may be carefully selected.

Figure 12:
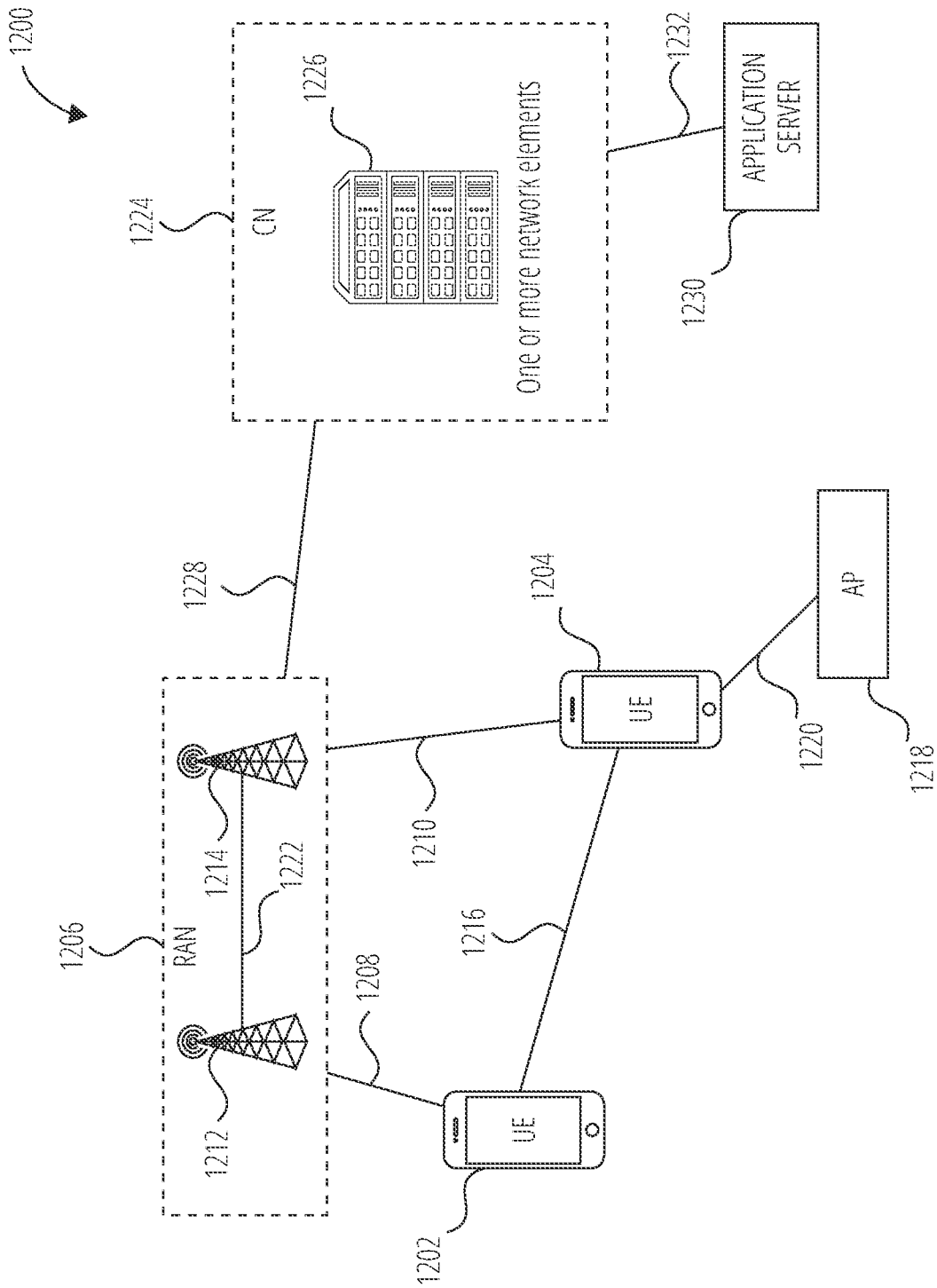
FIG. 12 illustrates an example architecture of a wireless communication system, according to embodiments disclosed herein.

FIG. 12 illustrates an example architecture of a wireless communication system 1200, according to embodiments disclosed herein. The following description is provided for an example wireless communication system 1200 that operates in conjunction with the LTE system standards and/or 5G or NR system standards as provided by 3GPP technical specifications.

As shown by FIG. 12, the wireless communication system 1200 includes UE 1202 and UE 1204 (although any number of UEs may be used). In this example, the UE 1202 and the UE 1204 are illustrated as smartphones (e.g., handheld touchscreen mobile computing devices connectable to one or more cellular networks), but may also comprise any mobile or non-mobile computing device configured for wireless communication.

The UE 1202 and UE 1204 may be configured to communicatively couple with a RAN 1206. In embodiments, the RAN 1206 may be NG-RAN, E-UTRAN, etc. The UE 1202 and UE 1204 utilize connections (or channels) (shown as connection 1208 and connection 1210, respectively) with the RAN 1206, each of which comprises a physical communications interface. The RAN 1206 can include one or more base stations, such as base station 1212 and base station 1214, that enable the connection 1208 and connection 1210.

In this example, the connection 1208 and connection 1210 are air interfaces to enable such communicative coupling, and may be consistent with RAT(s) used by the RAN 1206, such as, for example, an LTE and/or NR.

In some embodiments, the UE 1202 and UE 1204 may also directly exchange communication data via a sidelink interface 1216. The UE 1204 is shown to be configured to access an access point (shown as AP 1218) via connection 1220. By way of example, the connection 1220 can comprise a local wireless connection, such as a connection consistent with any IEEE 802.11 protocol, wherein the AP 1218 may comprise a Wi-Fi® router. In this example, the AP 1218 may be connected to another network (for example, the Internet) without going through a CN 1224.

In embodiments, the UE 1202 and UE 1204 can be configured to communicate using orthogonal frequency division multiplexing (OFDM) communication signals with each other or with the base station 1212 and/or the base station 1214 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1212 or base station 1214 may be implemented as one or more software entities running on server computers as part of a virtual network. In addition, or in other embodiments, the base station 1212 or base station 1214 may be configured to communicate with one another via interface 1222. In embodiments where the wireless communication system 1200 is an LTE system (e.g., when the CN 1224 is an EPC), the interface 1222 may be an X2 interface. The X2 interface may be defined between two or more base stations (e.g., two or more eNBs and the like) that connect to an EPC, and/or between two eNBs connecting to the EPC. In embodiments where the wireless communication system 1200 is an NR system (e.g., when CN 1224 is a 5GC), the interface 1222 may be an Xn interface. The Xn interface is defined between two or more base stations (e.g., two or more gNBs and the like) that connect to 5GC, between a base station 1212 (e.g., a gNB) connecting to 5GC and an eNB, and/or between two eNBs connecting to 5GC (e.g., CN 1224).

The RAN 1206 is shown to be communicatively coupled to the CN 1224. The CN 1224 may comprise one or more network elements 1226, which are configured to offer various data and telecommunications services to customers/subscribers (e.g., users of UE 1202 and UE 1204) who are connected to the CN 1224 via the RAN 1206. The components of the CN 1224 may be implemented in one physical device or separate physical devices including components to read and execute instructions from a machine-readable or computer-readable medium (e.g., a non-transitory machine-readable storage medium).

In embodiments, the CN 1224 may be an EPC, and the RAN 1206 may be connected with the CN 1224 via an S1 interface 1228. In embodiments, the S1 interface 1228 may be split into two parts, an S1 user plane (S1-U) interface, which carries traffic data between the base station 1212 or base station 1214 and a serving gateway (S-GW), and the S1-MME interface, which is a signaling interface between the base station 1212 or base station 1214 and mobility management entities (MMEs).

In embodiments, the CN 1224 may be a 5GC, and the RAN 1206 may be connected with the CN 1224 via an NG interface 1228. In embodiments, the NG interface 1228 may be split into two parts, an NG user plane (NG-U) interface, which carries traffic data between the base station 1212 or base station 1214 and a user plane function (UPF), and the S1 control plane (NG-C) interface, which is a signaling interface between the base station 1212 or base station 1214 and access and mobility management functions (AMFs).

Generally, an application server 1230 may be an element offering applications that use internet protocol (IP) bearer resources with the CN 1224 (e.g., packet switched data services). The application server 1230 can also be configured to support one or more communication services (e.g., VoIP sessions, group communication sessions, etc.) for the UE 1202 and UE 1204 via the CN 1224. The application server 1230 may communicate with the CN 1224 through an IP communications interface 1232.

Figure 13:
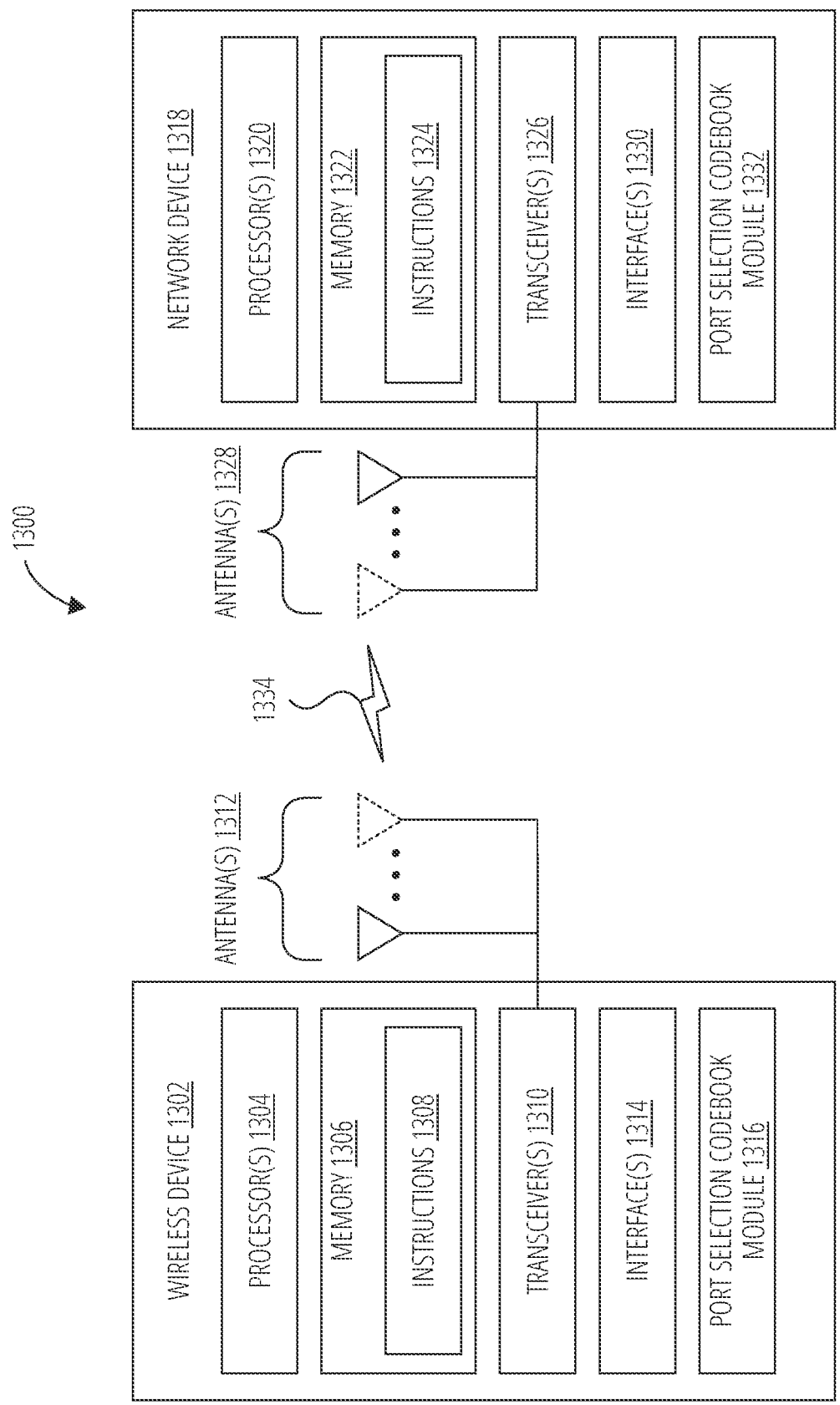
FIG. 13 illustrates a system for performing signaling between a wireless device and a network device, according to embodiments disclosed herein.

FIG. 13 illustrates a system 1300 for performing signaling 1334 between a wireless device 1302 and a network device 1318, according to embodiments disclosed herein. The system 1300 may be a portion of a wireless communications system as herein described. The wireless device 1302 may be, for example, a UE of a wireless communication system. The network device 1318 may be, for example, a base station (e.g., an eNB or a gNB) of a wireless communication system.

The wireless device 1302 may include one or more processor(s) 1304. The processor(s) 1304 may execute instructions such that various operations of the wireless device 1302 are performed, as described herein. The processor(s) 1304 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1302 may include a memory 1306. The memory 1306 may be a non-transitory computer-readable storage medium that stores instructions 1308 (which may include, for example, the instructions being executed by the processor(s) 1304). The instructions 1308 may also be referred to as program code or a computer program. The memory 1306 may also store data used by, and results computed by, the processor(s) 1304.

The wireless device 1302 may include one or more transceiver(s) 1310 that may include radio frequency (RF) transmitter and/or receiver circuitry that use the antenna(s) 1312 of the wireless device 1302 to facilitate signaling (e.g., the signaling 1334) to and/or from the wireless device 1302 with other devices (e.g., the network device 1318) according to corresponding RATs.

The wireless device 1302 may include one or more antenna(s) 1312 (e.g., one, two, four, or more). For embodiments with multiple antenna(s) 1312, the wireless device 1302 may leverage the spatial diversity of such multiple antenna(s) 1312 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1302 may be accomplished according to precoding (or digital beamforming) that is applied at the wireless device 1302 that multiplexes the data streams across the antenna(s) 1312 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1302 may implement analog beamforming techniques, whereby phases of the signals sent by the antenna(s) 1312 are relatively adjusted such that the (joint) transmission of the antenna(s) 1312 can be directed (this is sometimes referred to as beam steering).

The wireless device 1302 may include one or more interface(s) 1314. The interface(s) 1314 may be used to provide input to or output from the wireless device 1302. For example, a wireless device 1302 that is a UE may include interface(s) 1314 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1310/antenna(s) 1312 already described) that allow for communication between the UE and other devices and may operate according to known protocols (e.g., Wi-Fi®, Bluetooth®, and the like).

The wireless device 1302 may include a port selection codebook module 1316. The port selection codebook module 1316 may be implemented via hardware, software, or combinations thereof. For example, the port selection codebook module 1316 may be implemented as a processor, circuit, and/or instructions 1308 stored in the memory 1306 and executed by the processor(s) 1304. In some examples, the port selection codebook module 1316 may be integrated within the processor(s) 1304 and/or the transceiver(s) 1310. For example, the port selection codebook module 1316 may be implemented by a combination of software components (e.g., executed by a DSP or a general processor) and hardware components (e.g., logic gates and circuitry) within the processor(s) 1304 or the transceiver(s) 1310.

The port selection codebook module 1316 may be used for various aspects of the present disclosure. For example, the port selection codebook module 1316 may be configured to perform the method 300 shown in FIG. 3.

The network device 1318 may include one or more processor(s) 1320. The processor(s) 1320 may execute instructions such that various operations of the network device 1318 are performed, as described herein. The processor(s) 1304 may include one or more baseband processors implemented using, for example, a CPU, a DSP, an ASIC, a controller, an FPGA device, another hardware device, a firmware device, or any combination thereof configured to perform the operations described herein.

The network device 1318 may include a memory 1322. The memory 1322 may be a non-transitory computer-readable storage medium that stores instructions 1324 (which may include, for example, the instructions being executed by the processor(s) 1320). The instructions 1324 may also be referred to as program code or a computer program. The memory 1322 may also store data used by, and results computed by, the processor(s) 1320.

The network device 1318 may include one or more transceiver(s) 1326 that may include RF transmitter and/or receiver circuitry that use the antenna(s) 1328 of the network device 1318 to facilitate signaling (e.g., the signaling 1334) to and/or from the network device 1318 with other devices (e.g., the wireless device 1302) according to corresponding RATs.

The network device 1318 may include one or more antenna(s) 1328 (e.g., one, two, four, or more). In embodiments having multiple antenna(s) 1328, the network device 1318 may perform MIMO, digital beamforming, analog beamforming, beam steering, etc., as has been described.

The network device 1318 may include one or more interface(s) 1330. The interface(s) 1330 may be used to provide input to or output from the network device 1318. For example, a network device 1318 that is a base station may include interface(s) 1330 made up of transmitters, receivers, and other circuitry (e.g., other than the transceiver(s) 1326/antenna(s) 1328 already described) that enables the base station to communicate with other equipment in a core network, and/or that enables the base station to communicate with external networks, computers, databases, and the like for purposes of operations, administration, and maintenance of the base station or other equipment operably connected thereto.

The network device 1318 may include a port selection codebook module 1332. The port selection codebook module 1332 may be implemented via hardware, software, or combinations thereof. For example, the port selection codebook module 1332 may be implemented as a processor, circuit, and/or instructions 1324 stored in the memory 1322 and executed by the processor(s) 1320. In some examples, the port selection codebook module 1332 may be integrated within the processor(s) 1320 and/or the transceiver(s) 1326. For example, the port selection codebook module 1332 may be implemented by a combination of software components (e.g., executed by a DSP or a general processor) and hardware components (e.g., logic gates and circuitry) within the processor(s) 1320 or the transceiver(s) 1326.

The port selection codebook module 1332 may be used for various aspects of the present disclosure. For example, the port selection codebook module 1332 may be configured to perform the method 400 shown in FIG. 4.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE), the method comprising:
    decoding, at the UE, a channel state information (CSI) report configuration (CSI-ReportConfig) from a base station, the CSI-ReportConfig configuring a port selection codebook comprising a port selection matrix $W_1$, a combinational coefficient matrix $W_2$, and a frequency basis selection matrix $W_f$;
    based on the CSI-ReportConfig, determining, at the UE:
        for the port selection matrix $W_1$, up to L CSI reference signal (CSI-RS) ports out of P CSI-RS ports configured for measuring and reporting CSI, wherein the CSI-ReportConfig configures the UE to select a same number of the L CSI-RS ports for each of a plurality of spatial layers, and wherein the UE is configured to select a same location or a different location of the L CSI-RS ports between each of the plurality of spatial layers;
        for the frequency basis selection matrix $W_f$, up to Mv frequency basis out of N frequency basis; and
        for the combinational coefficient matrix $W_2$, up to L*Mv entries per layer; and
    reporting, from the UE to the base station, one or more of the port selection matrix $W_1$, the combinational coefficient matrix $W_2$, and the frequency basis selection matrix $W_f$.

2. The method of claim 1, wherein the CSI-ReportConfig configures the UE to measure a maximum number Pmax of CSI-RS ports.

3. The method of claim 2, wherein Pmax=32 ports.

4. The method of claim 1, wherein the CSI-ReportConfig configures an even number for the L CSI-RS ports, and wherein the CSI-ReportConfig configures the UE to select L/2 horizontally polarized (H-pol) CSI-RS ports and L/2 vertically polarized (V-pol) CSI-RS ports.

5. The method of claim 4, wherein the even number for the L CSI-RS ports is larger than four ports.

6. The method of claim 4, wherein the CSI-ReportConfig configures the UE to select a same number of ports from the L/2 H-pol CSI-RS ports and the L/2 V-pol CSI-RS ports.

7. The method of claim 4, further comprising selecting, at the UE, a different number of ports from the L/2 H-pol CSI-RS ports and the L/2 V-pol CSI-RS ports.

8. The method of claim 1, wherein the CSI-ReportConfig configures the UE to select the L CSI-RS ports out of the P CSI-RS ports.

9. The method of claim 1, wherein the CSI-ReportConfig configures the UE to select any number of k CSI-RS ports out of the P CSI-RS ports, where k<=L.

10. The method of claim 9, further comprising reporting, from the UE to the base station, the k CSI-RS ports and a location of the k CSI-RS ports among the P CSI-RS ports.

11. The method of claim 1, wherein the CSI-ReportConfig comprises port combination restrictions, the method further comprising selecting, at the UE, the L CSI-RS ports out of the P CSI-RS ports based on the port combination restrictions.

12. The method of claim 11, further comprising process, at the UE, a bitmap from the base station indicating the port combination restrictions.

13. The method of claim 1, wherein the CSI-ReportConfig configures Mv=1, the method further comprising selecting, at the UE, a direct current (DC) frequency basis for the frequency basis selection matrix $W_f$.

14. The method of claim 1, wherein the CSI-ReportConfig configures Mv>1, the method further comprising selecting, at the UE, Mv=2 for the frequency basis selection matrix $W_f$.

15. The method of claim 1, wherein the CSI-ReportConfig configures Mv>1, the method further comprising:
    selecting, at the UE, Mv=2 or Mv=4 for the frequency basis selection matrix $W_f$; and
    reporting, from the UE to the base station, that the UE supports Mv=2 or Mv=4.

16. The method of claim 1, wherein the CSI-ReportConfig configures Mv>1, the method further comprising selecting, at the UE, the Mv frequency basis for the frequency basis selection matrix $W_f$.

17. The method of claim 1, wherein the CSI-ReportConfig configures Mv>1, the method further comprising selecting, at the UE, less than or equal to the Mv frequency basis for the frequency basis selection matrix $W_f$.

18. The method of claim 1, wherein the CSI-ReportConfig indicates the Mv frequency basis of the N frequency basis for the UE to use, wherein the Mv frequency basis are consecutive or non-consecutive, and wherein the UE does not feedback the frequency basis selection matrix $W_f$ to the base station.

\* \* \* \* \*